(12) United States Patent
Nory et al.

(10) Patent No.: US 11,310,746 B2
(45) Date of Patent: Apr. 19, 2022

(54) TPC COMMAND INDICATION FOR MULTIPLE CLOSED LOOPS

(71) Applicant: Telefonaktiebolaget LM Ericsson (publ), Stockholm (SE)

(72) Inventors: Ravikiran Nory, San Josè, CA (US); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/646,621

(22) PCT Filed: Sep. 17, 2018

(86) PCT No.: PCT/SE2018/050941
§ 371 (c)(1),
(2) Date: Mar. 12, 2020

(87) PCT Pub. No.: WO2019/070178
PCT Pub. Date: Apr. 11, 2019

(65) Prior Publication Data
US 2020/0288404 A1  Sep. 10, 2020

Related U.S. Application Data

(60) Provisional application No. 62/567,044, filed on Oct. 2, 2017.

(51) Int. Cl.
*H04W 52/34* (2009.01)
*H04W 52/08* (2009.01)
(Continued)

(52) U.S. Cl.
CPC ........... *H04W 52/08* (2013.01); *H04L 5/0048* (2013.01); *H04W 52/143* (2013.01); *H04W 52/146* (2013.01); *H04W 72/042* (2013.01)

(58) Field of Classification Search
CPC ........... H04W 52/242; H04W 72/0473; H04W 52/34; H04W 72/082; H04W 52/08;
(Continued)

(56) References Cited

U.S. PATENT DOCUMENTS

2012/0257519 A1* 10/2012 Frank .................... H04W 52/16
370/252
2013/0301571 A1* 11/2013 Sorrentino .............. H04L 5/001
370/329
(Continued)

FOREIGN PATENT DOCUMENTS

| EP | 2 739 080 A1 | 6/2014 |
|---|---|---|
| WO | 2014 134955 A1 | 9/2014 |
| WO | 2017 165668 A1 | 9/2017 |

OTHER PUBLICATIONS

European Search Report issued for Application No./Patent No. 18864207.8-1212 / 3692750 / PCT/SE2018050941—dated May 20, 2021.
(Continued)

*Primary Examiner* — Tu X Nguyen
(74) *Attorney, Agent, or Firm* — Baker Botts, LLP

(57) ABSTRACT

According to certain embodiments, a method is performed by a wireless device configured with multiple power control closed loops for a serving cell. The method comprises receiving a transmit power control (TPC) command in a downlink control message that comprises a plurality of TPC commands. The method comprises determining a particular power control closed loop of the plurality of power control closed loops to which the TPC command should be applied. The particular power control closed loop is determined using the downlink control message. The method further comprises updating the particular power control closed loop using the TPC command.

18 Claims, 16 Drawing Sheets

(51) Int. Cl.
*H04L 5/00* (2006.01)
*H04W 52/14* (2009.01)
*H04W 72/04* (2009.01)

(58) Field of Classification Search
CPC .......... H04W 52/325; H04W 72/1263; H04W 12/63; H04W 36/0061; H04W 4/027; H04W 52/04; H04W 52/143; H04W 52/24; H04W 52/241; H04W 52/244; H04W 52/38
See application file for complete search history.

(56) References Cited

U.S. PATENT DOCUMENTS

| 2014/0204919 | A1 | 7/2014 | Chen et al. |
| 2014/0321406 | A1 | 10/2014 | Marinier et al. |
| 2015/0341866 | A1 | 11/2015 | Park et al. |
| 2018/0332541 | A1* | 11/2018 | Liu ..................... H04W 52/241 |

OTHER PUBLICATIONS

3GPP TSG RAN WG1 Meeting #90; Prague, Czechia; Source: NTT DOCOMO, INC.; Title: Summary of offline discussions on UL transmission without UL grant (R1-1714813)—Aug. 21-25, 2017.
3GPP TSG RAN WG1 Meeting NR#3; Nagoya, Japan; Source: Huawei, HiSilicon; Title: General considerations on UL power control design (R1-1715478)—Sep. 18-21, 2017.
3GPP TSG RAN WG1 Meeting 90bis; Prague, CZ; Source: Ericsson; Title: Further details on closed loop power control (R1-1718655)—Oct. 9-13, 2017.
PCT International Search Report for International application No. PCT/SE2018/050941—dated Jan. 14, 2019.
PCT Written Opinion of the International Searching Authority for International application No. PCT/SE2018/050941—dated Jan. 14, 2019.

* cited by examiner

TPC COMMAND INDICATION FOR MULTIPLE CLOSED LOOPS

PRIORITY

This nonprovisional application is a U.S. National Stage Filing under 35 U.S.C. § 371 of International Patent Application Serial No. PCT/SE2018/050941 filed Sep. 17, 2018 and entitled "TPC COMMAND INDICATION FOR MULTIPLE CLOSED LOOPS" which claims priority to U.S. Provisional Patent Application No. 62/567,044 filed Oct. 2, 2017 both of which are hereby incorporated by reference in their entirety.

TECHNICAL FIELD

The present disclosure relates, in general, to wireless communications and, more particularly, to transmit power control command indication for multiple closed loops.

BACKGROUND

Note that although terminology from 3$^{rd}$ Generation Partnership Project (3GPP) Long Term Evolution (LTE) has been used in this disclosure to exemplify the concepts described herein, this should not be seen as limiting the scope of the disclosure to only the aforementioned system. Other wireless systems, especially 5G/NR, WCDMA, WiMax, UMB and GSM, may also benefit from the ideas covered within this disclosure.

1.1 Power Control

Setting output power levels of transmitters (e.g., base stations in downlink (DL) and mobile stations in uplink (UL)) in mobile systems is commonly referred to as power control (PC). Objectives of PC include improved capacity, coverage, improved system robustness, and reduced power consumption.

In LTE, PC mechanisms can be categorized into the groups: (i) open-loop; (ii) closed-loop; and (iii) combined open- and closed-loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In systems with multiple channels between the terminals and the base stations (e.g., traffic and control channels), different power control principles may be applied to the different channels. Using different principles yields more freedom in adapting the power control principle to the needs of individual channels. The drawback is increased complexity of maintaining several principles.

1.2 PC Loops

In, for instance, LTE release 10, the user equipment (UE) is initially performing PC for the Physical Random Access Channel (PRACH) using Equation 1 below.

$$P_{PRACH}=\min\{P_{CMAX,c}(i)\text{PREAMBLE\_RECEIVED\_TARGET\_POWER}+PL_c\} \quad (1)$$

After a connection is established between the UE and the eNodeB, the UE can be configured for performing UL PC also on the Physical Uplink Control Channel (PUCCH), Physical Downlink Shared Channel (PDSCH) and Sounding Reference Signal (SRS) transmission. Setting the UE transmit power for a PUCCH transmission is done from:

$$P_{PUCCH}=\min\{P_{CMAX,c},P_{0,PUCCH}+PL_c+V_{Format}+g(i)\} \quad (2)$$

Here $P_{PUCCH}$ is the transmit power to use in a given subframe and $PL_c$ is the pathloss estimated by the UE. For the Physical Uplink Shared Channel, PUSCH, one instead uses Equation 3 below:

$$P_{PUSCH,c}=\min\{P_{CMAX,c}-P_{PUCCH},P_{0,PUSCH}+\alpha PL_c+10\log_{10}M+V_{MCS}+f(i)\} \quad (3)$$

where c denotes the serving cell and $P_{PUSCH,c}$ is the transmit power to use in a given subframe. For SRS, one defines $$P_{SRS,c}(i)=\min\{P_{CMAX,c}(i),P_{SRS\_OFFSET,c}(m)+10\log_{10}(M_{SRS,c})+P_{O\_PUSCH,c}(j)+\alpha_c(j)\cdot PL_c+f_c(i)\} \quad (4)$$

Note that $PL_c$ is a part of setting the power level for the UE transmission, which corresponds to the open-loop part of power control. It is clear from this that the pathloss estimation conducted by the UE plays an important role of the PC. The pathloss must in turn be estimated from a DL transmission and is typically done by measuring on a reference signal.

1.3 Closed-Loop PC

In the above PC formulas, there were two terms f(i) and g(i) defined that will correspond to the closed-loop part of the power control. These terms are controlled by signaling from the gNB using TPC (Transmission Power Control) command (over Medium Access Control (MAC) Control Element (CE) or Downlink Control Information (DCI)). By using this, the gNB will be able to impact the UE output power, which is useful in order to, for example: combat estimation errors impacting the UL PC; get rid of biases; and adapt the UE output power to the current interference level at the gNB. If the interference is high, it may be motivated to increase the UE output power.

There are different ways to configure the operation of f(i). In can be operating in "accumulated mode" or "absolute mode." In the case that accumulation is enabled, for instance based on the parameter Accumulation-enabled provided by higher layers, f(i) is given from $f_c(i))=f_c(i-1)+\delta_{PUSCH,c}(i-K_{PUSCH})$, where $\delta_{PUSCH,c}$ is a correction value, also referred to as a TPC command, and can take on values according to the tables below (see 3GPP Technical Specification 36.213 v.10.13.0 more for details on this).

TABLE 5.1.1.1-2

Mapping of TPC Command Field in DCI format 0/3/4 to absolute and accumulated $\delta_{PUSCH,c}$ values.

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 5.1.1.1-3

Mapping of TPC Command Field in DCI format
3A to accumulated $\delta_{PUSCH,c}$ values.

| TPC Command Field in DCI format 3A | Accumulated $\delta_{PUSCH,c}$ [dB] |
|---|---|
| 0 | −1 |
| 1 | 1 |

Furthermore, the UE shall reset accumulation: for serving cell c, when $P_{O\_UE\_PUSCH,c}$ value is changed by higher layers; and for the primary cell, when the UE receives random access response message.

The functionality of g(i) is similar and defined from $$g(i) = g(i-1) + \sum_{m=0}^{M-1} \delta_{PUCCH}(i - k_m),$$

where g(i) is the current PUCCH power control adjustment state, and where g(0) is the first value after reset. The UE shall reset accumulation: when $P_{O\_UE\_PUCCH}$ value is changed by higher layers; and when the UE receives a random access response message. $\delta_{PUCCH}$ is given by the tables below.

TABLE 5.1.2.1-1

Mapping of TPC Command Field in DCI format
1A/1B/1D/1/2A/2B/2C/2/3 to $\delta_{PUCCH}$ values.

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

TABLE 5.1.2.1-2

Mapping of TPC Command Field in
DCI format 3A to $\delta_{PUCCH}$ values.

| TPC Command Field in DCI format 3A | $\delta_{PUCCH}$ [dB] |
|---|---|
| 0 | −1 |
| 1 | 1 |

1.3.1 Individual TPC Commands in UL Grant

A closed-loop PC adjustment, usually referred to as a TPC (transmit power control) command, can be sent to the UE as part of an UL grant scheduling a PUSCH transmission (e.g., using DCI format 0/4 in LTE) or a DL assignment scheduling PDSCH (in which case the TPC command applies to setting the transmit power of PUCCH corresponding to the PDSCH scheduled by DL assignment), for example using DCI (1A,1,2,2A, etc. in LTE).

1.3.2 TPC Commands Sent for a Group of UEs

TPC commands can also be sent to a group of UEs using one PDCCH addressed to the group. This can be done by assigning different bit field locations in the DCI of a PDCCH message to different UEs. For example, locations 1,2 for a 2-bit TPC command to UE1; locations 3,4 for a 2-bit TPC command to UE2; and so on. For N UEs, the DCI will have at least 2N bits. A Cyclic Redundancy Check (CRC) that is scrambled by a Radio Network Temporary Identifier (RNTI) is also added to the DCI. Different groups of UEs can be assigned different RNTIs. For example, in LTE such commands are sent for adjusting PUSCH power using DCI format 3/3A and different groups of UEs are assigned different TPC-PUSCH-RNTIs. Similarly, for PUCCH power control different groups of UEs are assigned different TPC-PUCCH-RNTIs. Similarly, for SRS group-based TPC commands are sent using DCI 3B in LTE.

1.3.2.1 DCI Format 3 in LTE

DCI format 3 is used for the transmission of TPC commands for PUCCH and PUSCH with 2-bit power adjustments. The following information is transmitted by means of the DCI format 3: TPC command number 1, TPC command number 2, . . . , TPC command number N, where $$N = \left\lfloor \frac{L_{format0}}{2} \right\rfloor,$$

and where $L_{format\,0}$ is equal to the payload size of format 0 before CRC attachment when format 0 is mapped onto the common search space, including any padding bits appended to format 0. The parameter tpc-Index or tpc-Index-PUCCH-SCell-r13 provided by higher layers determines the index to the TPC command for a given UE.

If $$\left\lfloor \frac{L_{format0}}{2} \right\rfloor < \frac{L_{format0}}{2},$$

a bit of value zero shall be appended to format 3.

1.3.2.2 DCI Format 3A in LTE

DCI format 3A is used for the transmission of TPC commands for PUCCH and PUSCH with single-bit power adjustments. The following information is transmitted by means of the DCI format 3A: TPC command number 1, TPC command number 2, . . . , TPC command number M, where $M=L_{format0}$, and where $L_{format0}$ is equal to the payload size of format 0 before CRC attachment when format 0 is mapped onto the common search space, including any padding bits appended to format 0. The parameter tpc-Index or tpc-Index-PUCCH-SCell-r13 provided by higher layers determines the index to the TPC command for a given UE.

1.4 Beam Specific PC

It is envisioned that New Radio (NR) supports beam specific PC (although the exact details on what beam specific implies are not yet fully decided). Beam specific PC may, for instance, be a scheme that enables use cases where separate power control in multiple UE transmit (TX) and gNB receive (RX) beam pairs are maintained. Use cases include, for example:

A UE transmitting to a Transmission/Reception Point (TRP) using a certain beam switches to another beam and then consequently also switches from one PC loop to another.

A UE transmitting to a TRPs switches to another TRP and then consequently also switches from one PC loop to another.

It is expected that the beam specific PC will imply a set of PC loops as illustrated below for the case of PUSCH. Hence, there will exist a set of PC loops where each PC loop is connected to a beam.

TABLE 1

| PC loops RRC configured to the UE | |
|---|---|
| PC idx | PC loop |
| 0 | $P_{PUSCH,c}^{0}$ |
| 1 | $P_{PUSCH,c}^{1}$ |
| 2 | $P_{PUSCH,c}^{2}$ |
| 3 | $P_{PUSCH,c}^{3}$ |
| 4 | $P_{PUSCH,c}^{4}$ |
| 5 | $P_{PUSCH,c}^{5}$ |
| 6 | $P_{PUSCH,c}^{6}$ |

The UL PC loop can in this case be written as:

$$P_{PUSCH,c}^{q} = \min\{P_{CMAX,c}^{q} - P_{PUCCH}^{J}, P_{0,PUSCH}^{q} + \alpha_q PL_c^{q} + 10 \log_{10} M_q + V_{MCS}^{q} + f(i)_q\} \quad (5)$$

Here, the meaning of $\alpha_q$, $P_{0,PUSCH}^{q}$ etc. is that these parameters may be configured in a beam specific manner and may thus depend on q. They may, however, also be shared such that, for instance, $\alpha_0 = \alpha_1 = \ldots = \alpha_6 = \alpha$, meaning that only $\alpha$ needs to be configured. The index J in $P_{PUCCH}^{J}$ refers to the beam used for PUCCH transmission.

Furthermore, $PL_c^{q}$ implies that the path loss estimation is based on a certain reference signal defined for PC loop q. Hence, each time the reference signal corresponding to PC loop q is transmitted it may be used by the UE in order to estimate $PL_c^{q}$, which is typically done by performing a long term averaging as for example:

$$PL_c^{q} = \text{referenceSignalPower} - \text{higher\_layer\_filtered\_RSRP}\_q, \quad (6)$$

where referenceSignalPower is defined by the network.

Finally, for a beam currently not used for PUSCH, hence M=0, the equation may instead be defined as:

$$P_{PUSCH,c}^{q} = \min\{P_{CMAX,c}^{q} - P_{PUCCH}^{J}, P_{0,PUSCH}^{q} + \alpha_q PL_c^{q} + f(i)_q\} \quad (7)$$

1.5 RAN1 NR AdHoc #3

At the 3GPP RAN1 NR AdHoc #3 meeting (18-21 Sep. 2017), it was further agreed that the formulation of $P_{PUSCH,c}^{q}$ in NR is given from the agreement below. Hence, the index q, as described above, will in NR correspond to a certain set of indexes {j,k,l} as defined by the agreement below. One way to think of this is that there will exist functions j(q), k(q) and l(q) that define {j,k,l} for a given q. Herein, however, the indexing q is used instead of writing the alternative representation {j,k,l}.

Agreement:

$$P_{PUSCH,c}(i) = \min\begin{cases} P_{CMAX,c}(i), \\ 10\log_{10}(M_{PUSCH,c}(i)) + P_{0,c}(j) + \alpha_c(j) \cdot \\ PL_c(k) + \Delta_{TF,c}(i) + f_c(i, l) \end{cases}$$

Support at least $P_{cmax,c}(i)$, $M_{PUSCH,c}(i)$, $P_{0,c}(j)$, $\alpha_c(j)$, $PL_c(k)$, $\Delta TF,c(i)$ for NR PUSCH power control for serving cell c i is slot number j is the index of open-loop parameter K is the index of RS resource(s) for pathloss measurement FFS: exact Pcmax,c(i) definition and notation for above 6 GHz MPUSCH,c is related to the scheduled BW, FFS on the details $\Delta$TF,c is for single layer transmissions Support up to N closed-loop power control processes, i.e., fc(i,l), for NR PUSCH power control for serving cell c N=2 is working assumption l is the index of closed-loop power control process FFS: reset trigger, e.g., parameter set reconfiguration and or explicit signaling FFS: linkage and indication of {j, k, l}, explicit/implicit signalling Note: Exact way to capture the details of the above proposal depends on the uplink beam management and the editor In LTE, the UE typically maintains one closed-loop PC adjustment state (i.e., f( ) for PUSCH, go for PUCCH) for each physical channel (e.g., PUSCH/PUCCH) or signal (e.g., SRS) per serving cell. In some cases, the UE may maintain different closed-loop PC adjustment states for different sets of subframes (e.g., f1( ) for $1^{st}$ set of subframes configured by Radio Resource Control (RRC); f2( ) for $2^{nd}$ set of subframes configured by RRC).

In NR, the UE can be configured to have N (e.g., N=2) closed loops for PUSCH for a given serving cell. Given this, when a TPC command is received by the UE (e.g., using group-based approach described in section 1.3.2 above), additional signalling/mapping methods are needed to associate the TPC command with one of the N closed loop configurations.

SUMMARY

According to one example embodiment, a method in a wireless device is disclosed. The method comprises receiving a TPC command for one of a plurality of closed loops configured for the wireless device. The method comprises determining a particular closed loop of the plurality of closed loops to which the received TPC command should be applied. In certain embodiments, one or more of the following may apply:

the method may comprise applying the received TPC command to the determined particular closed loop of the plurality of closed loops;

the particular closed loop of the plurality of closed loops to which the received TPC command should be applied may be determined based on a DCI CRC of a PDCCH carrying the received TPC command;

the particular closed loop of the plurality of closed loops to which the received TPC command should be applied may be determined based on one or more closed loop indication bits included in DCI;

the closed loop indication bits may be explicit;

the DCI may comprise one or more of a TPC indication and a closed loop indication for multiple wireless devices in one PDCCH;

the plurality of closed loops may comprise a plurality of closed loop power control adjustment states;

the plurality of closed loops may comprise a plurality of closed loops for transmit power control for PUSCH transmissions on a first serving cell;

the method may comprise:
  detecting a PDCCH corresponding to a first DCI format;
  determining an identifier used to scramble the DCI CRC of the PDCCH; and
  applying the received TPC command to a first closed loop that corresponds to the determined identifier;

the identifier may comprise a radio network temporary identifier;

the method may comprise:
  detecting a PDCCH corresponding to a first DCI format that does not include any resource allocation bits;
  using a first set of bits in the DCI of the PDCCH to determine the received TPC command based on one or more bitfield positions of the first set of bits; and
  using a second set of bits in the DCI to determine a closed loop to which the received TPC command from the first set of bits should be applied.

According to another example embodiment, a wireless device is disclosed. The wireless device comprises a receiver and processing circuitry coupled to the receiver. The processing circuitry is configured to receive, via the receiver, a TPC command for one of a plurality of closed loops configured for the wireless device. The processing circuitry is configured to determine a particular closed loop of the plurality of closed loops to which the received TPC command should be applied.

According to another example embodiment, a method in a network node is disclosed. The method comprises determining a TPC command for one of a plurality of closed loops configured for a wireless device. The method comprises transmitting, to the wireless device, the determined TPC command, the transmission providing an indication of a particular closed loop of the plurality of closed loops to which the wireless device should apply the TPC command. In certain embodiments, one or more of the following may apply:
  the indication of the particular closed loop of the plurality of closed loops to which the wireless device should apply the TPC command may comprise a DCI CRC of a PDCCH carrying the received TPC command;
  the indication of the particular closed loop of the plurality of closed loops to which the wireless device should apply the TPC command may comprise an identifier used to scramble the DCI CRC of the PDCCH;
    the identifier may be associated with the particular closed loop of the plurality of closed loops;
    the identifier may comprise a radio network temporary identifier;
  the indication of the particular closed loop of the plurality of closed loops to which the wireless device should apply the TPC command may comprise one or more closed loop indication bits included in DCI;
    the closed loop indication bits may be explicit;
    the DCI may comprise one or more of a TPC indication and a closed loop indication for multiple wireless devices in one PDCCH;
  the plurality of closed loops may comprise a plurality of closed loop power control adjustment states; and
  the plurality of closed loops may comprise a plurality of closed loops for transmit power control for PUSCH transmissions on a first serving cell.

According to another example embodiment, a network node is disclosed. The network node comprises a transmitter and processing circuitry coupled to the transmitter. The processing circuitry is configured to determine a TPC command for one of a plurality of closed loops configured for a wireless device. The processing circuitry is configured to transmit, via the transmitter to the wireless device, the determined TPC command, the transmission providing an indication of a particular closed loop of the plurality of closed loops to which the wireless device should apply the TPC command.

According to another example embodiment, a method is disclosed for use in a wireless device configured with multiple power control closed loops for a serving cell. The method comprises receiving a TPC command in a downlink control message that comprises a plurality of TPC commands. The method comprises determining a particular power control closed loop of the plurality of power control closed loops to which the TPC command should be applied. The particular power control closed loop is determined using the downlink control message. The method further comprises updating the particular power control closed loop using the TPC command.

According to another example embodiment, a non-transitory computer-readable medium is disclosed. The non-transitory computer-readable medium comprises a computer program that, when executed by processing circuitry of a wireless device configured with multiple power control closed loops for a serving cell, causes the wireless device to receive a transmit power control TPC command in a downlink control message that comprises a plurality of TPC commands, determine a particular power control closed loop of the plurality of power control closed loops to which the TPC command should be applied (the particular power control closed loop is determined using the downlink control message), and update the particular power control closed loop using the TPC command.

According to another example embodiment, a wireless device is configured with multiple power control closed loops for a serving cell. The wireless device comprises a receiver and processing circuitry coupled to the receiver. The processing circuitry is configured to receive, via the receiver, a TPC command in a downlink control message that comprises a plurality of TPC commands. The processing circuitry is further configured to determine a particular power control closed loop of the plurality of power control closed loops to which the TPC command should be applied (the particular power control closed loop is determined using the downlink control message) and update the particular power control closed loop using the TPC command.

In certain embodiments, one or more of the following may apply to the method, the non-transitory computer-readable medium, and/or the wireless device described in the three preceding paragraphs:

In some embodiments, the downlink control message is a PDDCH message comprising DCI.

In some embodiments, one or more closed loop indication bits are received in the DC; and are used in determining the particular power control closed loop. In some embodiments, the one or more closed loop indication bits comprise an index value that is associated with the particular power control closed loop.

In some embodiments, an RNTI associated with the downlink control message is used in determining the particular power control closed loop.

In some embodiments, a DCI CRC of the downlink control message is used in determining the particular power control closed loop.

In some embodiments, the multiple power control closed loops are used by the wireless device for adjusting transmission powers of PUSCH transmissions on the serving cell.

In some embodiments, the multiple power control closed loops are used by the wireless device for adjusting transmission powers of PUCCH transmissions on the serving cell.

In some embodiments, the multiple power control closed loops are used by the wireless device for adjusting transmission powers of SRS transmissions on the serving cell.

In some embodiments, the TPC command indicates a power control adjustment (δ) value that should be applied to the particular power control closed loop.

In some embodiments, the downlink control message does not contain bits indicating an assignment of uplink resources.

In some embodiments, the downlink control message is addressed to a group comprising the wireless device and one or more other wireless devices and the plurality of TPC commands received in the downlink control message include one or more TPC commands associated with the one or more other wireless devices in the group.

In some embodiments, in response to receiving the downlink control message comprising the plurality of TPC commands, it is determined which of the plurality of TPC commands is to be applied by the wireless device. In some embodiments, the TPC command is determined using a bit field location in the DCI of the downlink control message. In some embodiments, the bit field location is indicated to the wireless device by higher layers.

In some embodiments, each of the plurality of power control closed loops is associated with a respective beam of the serving cell.

In some embodiments, updating the particular power control closed loop comprises adjusting a transmission power used in transmitting a PUSCH transmission based on the power control adjustment (δ) value indicated by the particular TPC command.

According to another example embodiment, a method in a network node is disclosed. The method comprises determining a TPC command for a particular one of multiple power control closed loops configured on a serving cell for a wireless device. The method further comprises transmitting a downlink control message comprising a plurality of TPC commands. The downlink control message includes the TPC command determined for the particular power control closed loop and provides an indication of the particular power control closed loop to which the wireless device should apply the TPC command.

According to another example embodiment, a non-transitory computer-readable medium comprises a computer program that, when executed by processing circuitry of a network node, causes the network node to determine a TPC command for a particular one of multiple power control closed loops configured on a serving cell for a wireless device. The computer program causes the network node to transmit a downlink control message comprising a plurality of TPC commands. The downlink control message includes the TPC command determined for the particular power control closed loop and provides an indication of the particular power control closed loop to which the wireless device should apply the TPC command.

According to another example embodiment, a network node comprises a transmitter and processing circuitry coupled to the transmitter. The processing circuitry is configured to determine a TPC command for a particular one of multiple power control closed loops configured on a serving cell for a wireless device. The processing circuitry is further configured to transmit, via the transmitter, a downlink control message comprising a plurality of TPC commands. The downlink control message includes the TPC command determined for the particular power control closed loop and provides an indication of the particular power control closed loop to which the wireless device should apply the TPC command.

In certain embodiments, one or more of the following may apply to the method, the non-transitory computer-readable medium, and/or the network node described in the three preceding paragraphs:

In some embodiments, the downlink control message is a PDCCH message comprising DCI.

In some embodiments, the indication comprises one or more closed loop indication bits provided in the downlink control message. In some embodiments, the one or more closed loop indication bits comprise an index value that is associated with the particular power control closed loop.

In some embodiments, an RNTI associated with the wireless device is used to scramble at least a portion of the downlink control message as an indication of the particular power control closed loop.

In some embodiments, a DCI CRC of the downlink control message is used to indicate the particular power control closed loop.

In some embodiments, the multiple power control closed loops are used by the wireless device for adjusting transmission powers of PUSCH transmissions on the serving cell.

In some embodiments, the multiple power control closed loops are used by the wireless device for adjusting transmission powers of PUCCH transmissions on the serving cell.

In some embodiments, the multiple power control closed loops are used by the wireless device for adjusting transmission powers of SRS transmissions on the serving cell.

In some embodiments, the TPC command indicates a power control adjustment (δ) value that should be applied to the particular power control closed loop.

In some embodiments, the downlink control message does not contain bits indicating an assignment of uplink resources.

In some embodiments, the downlink control message is addressed to a group comprising the wireless device and one or more other wireless devices and the plurality of TPC commands transmitted in the downlink control message include one or more TPC commands associated with the one or more other wireless devices in the group.

In some embodiments, an indication of which of the plurality of TPC commands is to be applied by the wireless device is provided to the wireless device. In some embodiments, the downlink control message includes a bitfield location that is assigned to the wireless device and the assigned bit field location includes the TPC command that should be applied by the wireless device. In some embodiments, the bit field location is indicated to the wireless device by higher layers.

In some embodiments, each of the plurality of power control closed loops is associated with a respective beam of the serving cell.

In some embodiments, the TPC command indicates a power control adjustment (δ) value that the wireless device should use to adjust a transmission power of a PUSCH transmission.

In some embodiments, DCI is transmitted. The DCI comprises one or more first closed loop indication bits and one or more second closed loop indication bits. The first closed loop indication bits indicate a first power control closed loop to which one of the plurality of TPC commands applies. The second closed loop indication bits indicate a second power control closed loop to which another of the plurality of TPC commands applies. The number of first closed loop indication bits is different from the number of second closed loop indication bits.

Certain embodiments of the present disclosure may provide one or more technical advantages. As one example, for a wireless device configured with multiple closed loops, certain embodiments may advantageously help the wireless device unambiguously identify the closed loop to which TPC commands received in a PDDCH should be applied, especially for the cases where PDCCH carries multiple TPC commands applicable to a group of wireless devices. As another example, certain embodiments may advantageously provide a low-overhead solution for indicating group TPC commands with different closed loops for different types of PUSCH transmissions (e.g., grant based vs. grant free, PUSCH corresponding to different beams/TRPs). As still another example, certain embodiments may advantageously provide a more flexible solution as the closed loop is explicitly indicated. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 12-16 are flow diagrams of methods in a network node, in accordance with certain embodiments.

DETAILED DESCRIPTION

Figure 1:
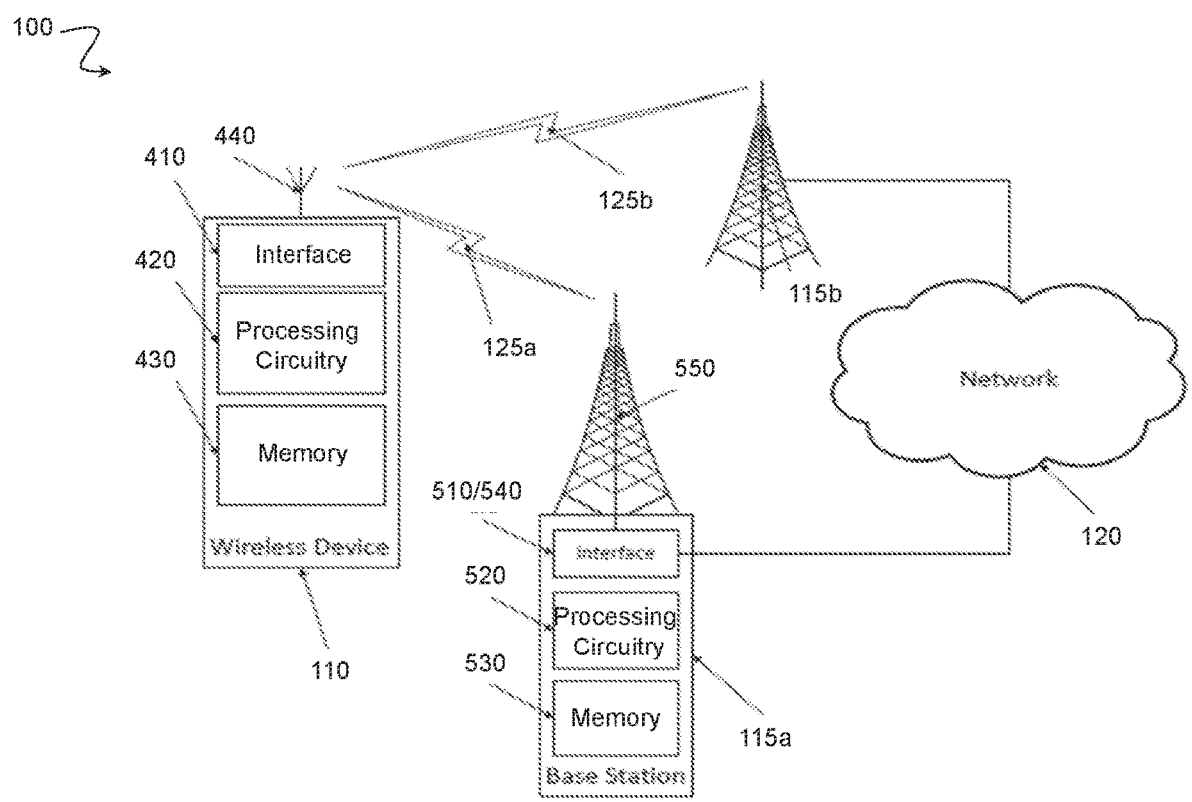
FIG. 1 is a block diagram illustrating an embodiment of a network, in accordance with certain embodiments.

As described above, in LTE the UE typically maintains one closed-loop PC adjustment state (i.e., f( ) for PUSCH, go for PUCCH) for each physical channel (e.g., PUSCH/PUCCH) or signal (e.g., SRS) per serving cell. In some cases, the UE may maintain different closed-loop PC adjustment states for different sets of subframes (e.g., f1( ) for $1^{st}$ set of subframes configured by Radio Resource Control (RRC); f2( ) for $2^{nd}$ set of subframes configured by RRC). In NR, the UE can be configured to have N (e.g., N=2) closed loops for PUSCH for a given serving cell. Given this, when a TPC command is received by the UE (e.g., using group-based approach described in section 1.3.2 above), additional signalling/mapping methods are needed to associate the TPC command with one of the N closed loop configurations.

The present disclosure contemplates various embodiments that may address these and other deficiencies associated with existing approaches. In certain embodiments, when a wireless device (e.g., a UE) is configured with multiple closed loops for determining transmission power of a particular physical channel/signal in a serving cell (e.g., f1_c( ), f2_c( ), . . . fN_c( )), the closed loop applicable to a TPC command received for the physical channel/signal is determined based on the DCI CRC (i.e., an identifier used for scrambling the DCI CRC) of the PDCCH that contains the TPC command. In certain embodiments, specific DCI format structures are used that can carry TPC indication+closed loop indication for multiple wireless devices in one PDCCH.

According to a first example embodiment, the closed loop applicable to a particular TPC command is determined based on the DCI CRC of the PDCCH carrying the TPC command. According to a second example embodiment, the closed loop applicable to a particular TPC command is determined based on explicit closed loop indication bits included in the DCI. In such a scenario, specific DCI format structures can carry TPC indication+closed loop indication for multiple UEs in one PDCCH, as described herein.

Certain embodiments of the present disclosure may provide one or more technical advantages. For example, for a wireless device configured with multiple closed loops, the various embodiments described herein may advantageously help the wireless device unambiguously identify the closed loop to which TPC commands received in a PDDCH should be applied, especially for the cases where PDCCH carries multiple TPC commands applicable to a group of wireless devices. As another example, the first example embodiment described above may advantageously provide a low-overhead solution for indicating group TPC commands with different closed loops for different types of PUSCH transmissions (e.g., grant based vs. grant free, PUSCH corresponding to different beams/TRPs). As still another example, the second example embodiment described above may advantageously provide a more flexible solution, as the closed loop is explicitly indicated. Other advantages may be readily apparent to one having skill in the art. Certain embodiments may have none, some, or all of the recited advantages.

FIG. 1 is a block diagram illustrating an embodiment of a network 100, in accordance with certain embodiments. Network 100 includes one or more wireless devices 110 and one or more network node(s) 115 (including network nodes 115*a* and 115*b* in the example embodiment of FIG. 1). Network node 115*a* comprises processing circuitry 520, memory 530, interface 510/540, and antenna 550. Wireless device 110 comprises processing circuitry 420, memory 430, interface 410 and antenna 440. These components may work together in order to provide network node and/or wireless device functionality, such as providing wireless connections in network 100.

For example, wireless devices 110 may communicate with network nodes 115 over a wireless interface. For example, wireless device 110 may transmit wireless signals 125*a*, 125*b* to one or more of network nodes 115, and/or receive wireless signals 125*a*, 125*b* from one or more of network nodes 115. Wireless signals 125*a*, 125*b* may contain voice traffic, data traffic, control signals, and/or any other suitable information. In some embodiments, an area of wireless signal coverage associated with a network node 115 may be referred to as a cell. In some embodiments, wireless device 110 may have device-to-device (D2D) capability. Thus, wireless devices 110 may be able to receive signals from and/or transmit signals directly to another wireless device.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of one or more Internet Protocol (IP) networks, public switched telephone networks (PSTNs), packet data networks, optical networks, public or private data networks, local area networks (LANs), wireless local area networks (WLANs), wired networks, wireless networks, metropolitan area networks (MANs), wide area networks (WAN), a local, regional, or global communication or computer network such as the Internet, an enterprise intranet, or any other suitable communication links, including combinations thereof, to enable communication between devices.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the RAN. In certain embodiments, network nodes 115 may interface with one or more network nodes over an internode interface, such as, for example, an X2 interface.

As described above, example embodiments of network 100 may include one or more wireless devices 110, and one or more different types of network nodes 115 capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, UEs such as smart phones. Further examples include wireless cameras, wireless-enabled tablet computers, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, or any other suitable devices.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless device 110 may support D2D communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network node. The wireless device may in this case be a M2M device, which may in a 3GPP context be referred to as a MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 1, wireless device 110 may be any type of wireless endpoint, mobile station, mobile phone, wireless local loop phone, smartphone, UE, desktop computer, PDA, cell phone, tablet, laptop, VoIP phone or handset, which is able to wirelessly send and receive data and/or signals to and from a network node, such as network node 115 and/or other wireless devices. Wireless device 110 comprises processing circuitry 420, memory 430, interface 410, and antenna 440. The components of wireless device 110 are depicted as single boxes located within a single larger box, however in practice a wireless device may comprise multiple different physical components that make up a single illustrated component (e.g., memory 430 may comprise multiple discrete microchips, each microchip representing a portion of the total storage capacity).

Processing circuitry 420 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as memory 430, wireless device 110 functionality. Such functionality may include providing various wireless features discussed herein, including any of the features or benefits disclosed herein.

Memory 430 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Memory 430 may store any suitable data, instructions, or information, including software and encoded logic, utilized by wireless device 110. Memory 430 may be used to store any calculations made by processing circuitry 420 and/or any data received via interface 410.

Interface 410 may be used in the wireless communication of signalling and/or data between wireless device 110 and network nodes 115. For example, interface 410 may perform any formatting, coding, or translating that may be needed to allow wireless device 110 to send and receive data from network nodes 115 over a wireless connection. Interface 410 may also include a radio transmitter and/or receiver that may be coupled to or a part of antenna 440. The radio may receive digital data that is to be sent out to network nodes 115 via a wireless connection. The radio may convert the digital data into a radio signal having the appropriate channel and bandwidth parameters. The radio signal may then be transmitted via antenna 440 to network nodes 115.

Antenna 440 may be any type of antenna capable of transmitting and receiving data and/or signals wirelessly. In some embodiments, antenna 440 may comprise one or more omni-directional, sector or panel antennas operable to transmit/receive radio signals between, for example, 2 GHz and 66 GHz. In some embodiments, antenna 440 may be able to transmit/receive signals outside this range. As one example, an antenna 440 operating in a 5G system may support transmission/reception at lower frequencies (e.g., as low as 400 MHz). For simplicity, antenna 440 may be considered a part of interface 410 to the extent that a wireless signal is being used.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

In FIG. 1, network node 115*a* comprises processing circuitry 520, memory 530, interface 510/540, and antenna 550. These components are depicted as single boxes located within a single larger box. In practice, however, network node 115*a* may comprise multiple different physical components that make up a single illustrated component (e.g., interface 510/540 may comprise terminals for coupling wires for a wired connection and a radio transceiver for a wireless connection). As another example, network node 115*a* may be a virtual network node in which multiple different physically separate components interact to provide the functionality of network node 115*a* (e.g., processing circuitry 520 may comprise three separate processors located in three separate enclosures, where each processor is responsible for a different function for a particular instance of network node 115*a*). Similarly, network node 115*a* may be composed of multiple physically separate components (e.g., a NodeB component and a RNC component, a BTS component and a BSC component, etc.), which may each have their own respective processor, storage, and interface components. In certain scenarios in which network node 115*a* comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 115*a* may be configured to support multiple radio access technologies (RATs). In such embodiments, some components may be duplicated (e.g., separate memory 530 for the different RATs) and some components may be reused (e.g., the same antenna 550 may be shared by the RATs).

Processing circuitry 520 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115*a* components, such as memory 530, network node 115*a* functionality. For example, processing circuitry 520 may execute instructions stored in memory 530. Such functionality may include providing various wireless features discussed herein to one or more wireless devices, such as wireless device 110, including any of the features or benefits disclosed herein.

Memory 530 may comprise any form of volatile or non-volatile computer readable memory including, without limitation, persistent storage, solid state memory, remotely mounted memory, magnetic media, optical media, RAM, ROM, removable media, or any other suitable local or remote memory component. Memory 530 may store any suitable instructions, data or information, including software and encoded logic, utilized by network node 115*a*. Memory 530 may be used to store any calculations made by processor 520 and/or any data received via interface 510/540.

Network node 115*a* also comprises interface 510/540 which may be used in the wired or wireless communication of signalling and/or data between network node 115*a*, network 115b, and/or wireless device 110. For example, interface 510/540 may perform any formatting, coding, or translating that may be needed to allow network node 115a to send and receive data from network 115b over a wired connection. Interface 510/540 may also include a radio transmitter and/or receiver that may be coupled to or a part of antenna 550. The radio may receive digital data that is to be sent out to other network nodes or wireless devices via a wireless connection. The radio may convert the digital data into a radio signal having the appropriate channel and bandwidth parameters. The radio signal may then be transmitted via antenna 550 to the appropriate recipient (e.g., wireless device 110).

Antenna 550 may be any type of antenna capable of transmitting and receiving data and/or signals wirelessly. In some embodiments, antenna 550 may comprise one or more omni-directional, sector or panel antennas operable to transmit/receive radio signals between, for example, 2 GHz and 66 GHz. In some embodiments, antenna 550 may be able to transmit/receive signals outside this range. As one example, an antenna 550 operating in a 5G system may support transmission/reception at lower frequencies (e.g., as low as 400 MHz). An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, the term "radio node" is used generically to refer both to wireless devices and network nodes, as each is respectively described above.

The terminology such as network node and wireless device should be considered non-limiting and does in particular not imply a certain hierarchical relation between the two; in general "network node" could be considered as device 1 and "wireless device" device 2, and these two devices communicate with each other over some radio channel.

Example embodiments of wireless device 110, network nodes 115, and other network nodes (such as radio network controller or core network node) are described in more detail below with respect to FIGS. 4-8.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In different embodiments, the wireless network 100 may comprise any number of wired or wireless networks, network nodes, base stations, controllers, wireless devices, relay stations, and/or any other components that may facilitate or participate in the communication of data and/or signals whether via wired or wireless connections.

Furthermore, although certain embodiments may be described as implemented in a LTE network, the embodiments may be implemented in any appropriate type of telecommunication system using any suitable components, and are applicable to any suitable radio access technology (RAT) or multi-RAT systems. For example, the various embodiments described herein may be applicable to LTE, LTE-Advanced, NR, 5G, UMTS, HSPA, GSM, cdma2000, WCDMA, WiMax, UMB, WiFi, another suitable RAT, or any suitable combination of one or more RATs. Thus, network 100 may represent any type of communication, telecommunication, data, cellular, and/or radio network or other type of system. In particular embodiments, the network 100 may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Although certain embodiments may be described in the context of wireless transmissions in the DL, the present disclosure contemplates that the various embodiments are equally applicable in the UL.

Although the solutions described herein may be implemented in any appropriate type of system using any suitable components, particular embodiments of the described solutions may be implemented in a wireless network such as the example wireless communication network illustrated in FIG. 1. In the example embodiment of FIG. 1, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Some of the embodiments contemplated herein will now be described more fully hereinafter with reference to the accompanying drawings. Other embodiments, however, are contained within the scope of this disclosure and should not be construed as limited to only the embodiments set forth herein; rather, these embodiments are provided by way of example to convey the scope of the concept to those skilled in the art. Like numbers refer to like elements throughout the description.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

As described above, the present disclosure contemplates various embodiments that may address one or more deficiencies associated with existing approaches to transmit power control. According to a first example embodiment, the closed loop applicable to a particular TPC command is determined based on the DCI CRC of the PDCCH carrying the TPC command. According to a second example embodiment, the closed loop applicable to a particular TPC command is determined based on explicit closed loop indication bits included in the DCI. In such a scenario, specific DCI format structures can carry TPC indication+closed loop indication for multiple wireless devices in one PDCCH, as described herein.

When a wireless device (e.g., UE) is configured with N closed loops for transmit power control for PUSCH transmissions on a first serving cell c (e.g., f1_c( ), f2_c( ), ... fN_c( )), and the UE receives a PDCCH with a DCI associated with an UL grant, the closed loop to use for setting the transmit power of the PUSCH transmission corresponding to the UL grant can be based on explicit DCI bits indicating the specific closed loop to use, or implicitly based on the beam/Quasi-Co-Location (QCL) configuration associated with the PUSCH transmission (e.g., as described in P72932—Beam Indication for UL Power Control, P72933—Unified UL and DL Beam Indication). The TPC command included in the PDCCH DCI can be used to update the state of the determined closed loop. The UE can also receive TPC commands in PDCCH DCI without an associated UL grant e.g. using a DCI format similar to LTE DCI format 3/3A. In such cases, the closed loop to which the TPC command applies can be determined using one or more of the example embodiments described in below.

Example Embodiment 1

In a first example embodiment, a wireless device 110 (e.g., a UE 110) is configured with N closed loops for transmit power control for PUSCH transmissions on a first serving cell c (e.g., f1_c( ), f2_c( ), ... fN_c( )). When UE 110 detects a PDCCH corresponding to a first DCI format (e.g., a DCI format similar to LTE DCI format 3/3A), and if the DCI CRC of the PDCCH is scrambled by a first identifier (e.g., TPC-PUSCH-RNTI1), UE 110 applies a TPC command included in the DCI to a first closed loop that corresponds to the first RNTI. When UE 110 detects a PDCCH corresponding to the first DCI format, and if the DCI CRC of the PDCCH is scrambled by a second identifier (e.g., TPC-PUSCH-RNTI2), UE 110 applies a TPC command included in the DCI to a second closed loop that corresponds to the second RNTI. In other words, UE 110 determines the closed loop to which a TPC command is applied based on the RNTI of the PDCCH carrying the TPC command.

For example, if a PDCCH with a DCI format containing multiple TPC commands is received in subframe i, and the DCI CRC of the PDCCH is scrambled by TPC-PUSCH-RNTI1, and if a TPC command for UE 110 indicates a power adjustment delta; UE 110 will update f1_c(i)=f1_c(i−1)+delta; If the DCI CRC of the PDCCH is scrambled by TPC-PUSCH-RNTI2, UE 110 will update f2c(i)=f2_c(i−1)+delta. UE 110 will leave the closed loops for which no TPC command is detected unchanged.

The association between RNTI and corresponding closed loop can be based on any suitable criteria. As one example, the first RNTI and the first closed loop (i.e., f1_c( )) may be associated with a first type (e.g., grant-based) of PUSCH transmissions and the second RNTI and second closed loop (i.e., f2_c( )) may be associated with a second type (e.g., grant-free) of PUSCH transmissions. In such a scenario, for the first type of PUSCH transmissions, the first closed loop f1_c( ) is updated when the TPC command is received in PDCCH with the first DCI format (e.g., the first DCI format that does not include any UL resource allocation bits for allocation RBs for PUSCH transmission). The first closed loop f1_c( ) is also updated when the TPC command is received in PDCCH with a second DCI format where the second DCI format includes bits indicating a TPC command and also UL resource allocation. For the second type of PUSCH transmissions, the second closed loop f2_c( ) is updated when the TPC command is received in PDCCH with the first DCI format. However, when a TPC command with second DCI format that includes UL resource allocation bits is received, f2_c( ) is not updated.

As another example, the first RNTI and the first closed loop (i.e., f1_c( )) may be associated with a PUSCH transmission corresponding to a first beam/TRP and the second RNTI and second closed loop (i.e., f2_c( )) may be associated with PUSCH transmissions corresponding to a second TRP/beam.

In certain embodiments, there will also exist a set of identifiers (e.g., TPC-PUSCH-RNTI_SET1, etc.), with the implication that UE 110 would apply the TPC command included in the DCI to multiple closed loops for a given UE. TPC-PUSCH-RNTI_SET1 may, for instance, imply that the TPC included in the DCI is applied to both the closed loops corresponding to TPC-PUSCH-RNTI1 and TPC-PUSCH-RNTI2. This would thus enable a way to affect multiple closed loops with one TPC.

Example Embodiment 2

In a second example embodiment, a wireless device 110 (e.g., a UE 110) is configured with N closed loops for transmit power control for PUSCH transmissions on a first serving cell c (e.g., f1_c( ), f2_c( ), ... fN_c( )). When UE 110 detects a PDCCH corresponding to a first DCI format which does not include any resource allocation bits, UE 110 uses a first set of bits in the DCI of the PDCCH to determine its TPC command based on the bitfield position(s) of the first set of bits, and a second set of bits in the DCI to determine a closed loop to which the TPC command from the first set of bits should be applied. UE 110 adjusts the closed loop based on the determined TPC command. The DCI CRC of the PDCCH can be scrambled with an identifier applicable to a group of UEs (e.g. similar to TPC-PUSCH RNTI in LTE).

For example, if N=2 closed loops are utilized and if a PDCCH with a DCI format containing multiple TPC commands is received in subframe i, and bits at bitfield positions x, x+1 (i.e., first set of bits) indicate a TPC command corresponding to power adjustment delta, and a bit at bitfield position x+2 (i.e., second set of bits) indicates closed loop f1_c( ), UE 110 updates f1_c(i)=f1_c(i−1)+delta. If the bit at bitfield position x+2 indicates closed loop f2_c( ), UE 110 updates f2_c(i)=f2_c(i−1)+delta.

Table 2 below shows one possible example of DCI format containing TPC bits and explicit indication of closed loop for multiple UEs that can be transmitted by a gNB and received by the UE. Other alternatives are also possible. For example, the TPC commands can be 2 bits and closed loop indication can also be 2 bits (corresponding to N=4 closed loops configured to each UE). In another example, the number of bits used for closed loop indication can be different for different UEs (i.e., UE1 has 2 bits for TPC followed by 1 bit for f( ) indication; UE2 has 2 bits for TPC followed by 2 bits for f( ) indication, ... UEN has 2 bits for TPC followed by 1 bit for f( ) indication). For this alternative, higher layers explicitly indicate a starting bitfield position using which the UE determines the TPC bits, and f( ) indication bits applicable to it. In another example, while TPC bits in PDCCH DCI are individually signalled for each UE, the f( ) indication in the PDCCH DCI can be common to all the UEs for which the received PDCCH is applicable.

TABLE 2

Example of explicit TPC command and closed loop indication in a PDCCH with TPC commands for multiple UEs assuming N = 2 closed loops are utilized

| Bitfield position(s) in DCI of the first DCI format | Information indicated by the bit(s) at the corresponding bitfield position | Applicable UE |
|---|---|---|
| x, x + 1 | 2 bit TPC command | UE1 |
| x + 2 | applicable closed loop for the TPC command in above row (e.g. fl_c( ) if bit is 0; f2_c( ) if bit is 1) | UE1 |
| x + 3, x + 4 | 2 bit TPC command | UE2 |
| x + 5 | applicable closed loop for the TPC command in above row (e.g. fl_c( ) if bit is 0; f2_c( ) if bit is 1) | UE2 |
| ... | ... | ... |
| ... | ... | ... |
| x + 3*N − 3, x + 3*N − 2 | 2 bit TPC command | UE N |
| x + 3*N − 1 | applicable closed loop for the TPC command in above row (e.g. fl_c( ) if bit is 0; f2_c( ) if bit is 1) | UE N |

In another embodiment, the indication may also indicate that the TPC should be applied to multiple closed loops, for instance apply the TPC to both f1_c( ) and f2_c( ) in case of N=2 closed loops.

While the above embodiments discuss closed loop indication for PUSCH, the described methods and signalling can also be applied for PUCCH/SRS closed loop indication (e.g. g(is used in place of f( ), and TPC commands for PUCCH can be in a separate DCI format).

Figure 2:
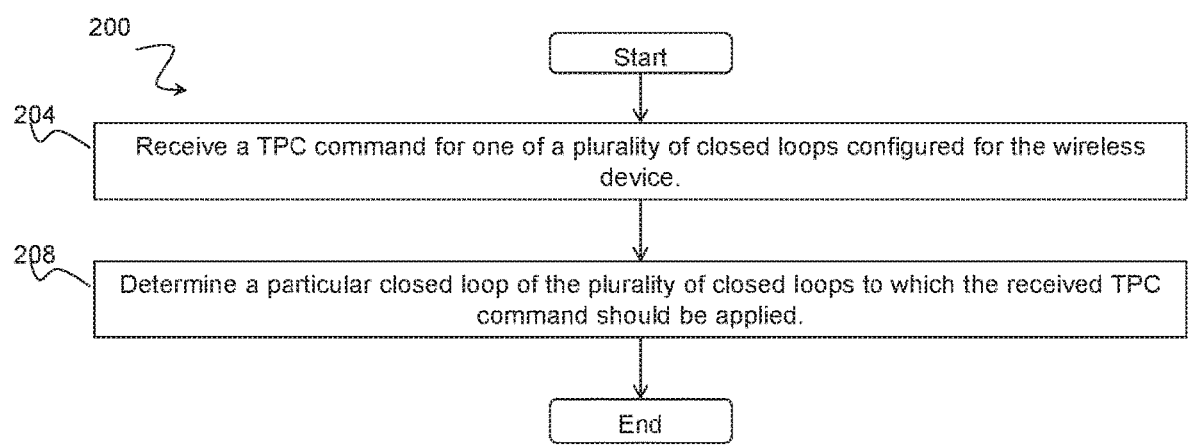
FIG. 2 is a flow diagram of a method in a wireless device, in accordance with certain embodiments.

FIG. 2 is a flow diagram of a method 200 in a wireless device, in accordance with certain embodiments. Method 200 begins at step 204, where the wireless device receives a TPC command for one of a plurality of closed loops configured for the wireless device. In certain embodiments, the plurality of closed loops may comprise a plurality of closed loop power control adjustment states. In certain embodiments, the plurality of closed loops may comprise a plurality of closed loops for transmit power control for PUSCH transmissions on a first serving cell.

At step 208, the wireless device determines a particular closed loop of the plurality of closed loops to which the received TPC command should be applied. In certain embodiments, the method may comprise applying the received TPC command to the determined particular closed loop of the plurality of closed loops.

In certain embodiments, the particular closed loop of the plurality of closed loops to which the received TPC command should be applied may be determined based on a DCI CRC of a PDCCH carrying the received TPC command. In certain embodiments, the method may comprise: detecting a PDCCH corresponding to a first DCI format; determining an identifier used to scramble the DCI CRC of the PDCCH; and applying the received TPC command to a first closed loop that corresponds to the determined identifier. In certain embodiments, the identifier may comprise a radio network temporary identifier.

In certain embodiments, the particular closed loop of the plurality of closed loops to which the received TPC command should be applied may be determined based on one or more closed loop indication bits included in DCI. In certain embodiments, the closed loop indication bits may be explicit. In certain embodiments, the DCI may comprise one or more of a TPC indication and a closed loop indication for multiple wireless devices in one PDCCH. In certain embodiments, the method may comprise: detecting a PDCCH corresponding to a first DCI format that does not include any resource allocation bits; using a first set of bits in the DCI of the PDCCH to determine the received TPC command based on one or more bitfield positions of the first set of bits; and using a second set of bits in the DCI to determine a closed loop to which the received TPC command from the first set of bits should be applied.

Figure 3:
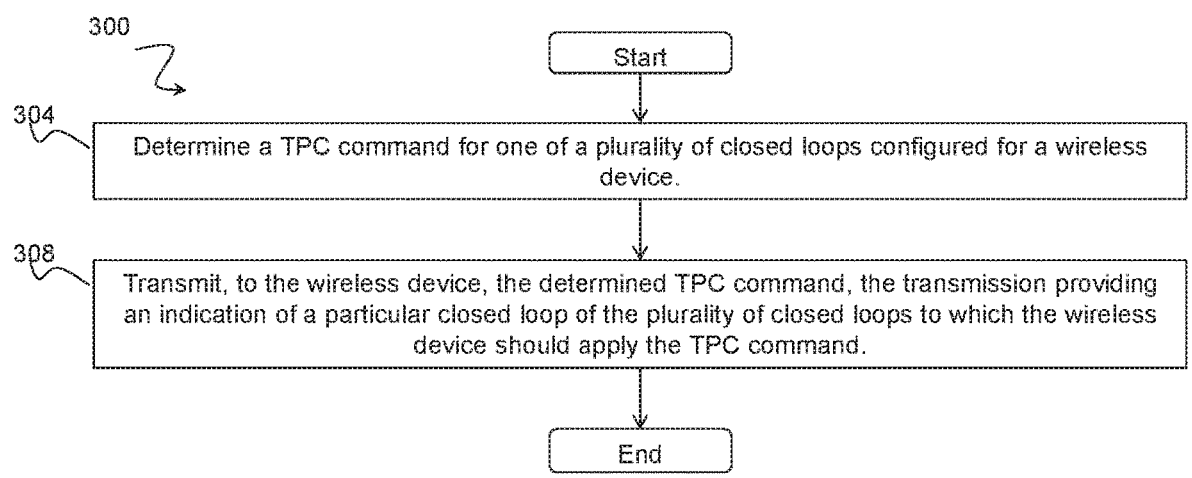
FIG. 3 is a flow diagram of a method in a network node, in accordance with certain embodiments.

FIG. 3 is a flow diagram of a method 300 in a network node, in accordance with certain embodiments. Method 300 begins at step 304, where the network node determines a TPC command for one of a plurality of closed loops configured for a wireless device. In certain embodiments, the plurality of closed loops may comprise a plurality of closed loop power control adjustment states. In certain embodiments, the plurality of closed loops may comprise a plurality of closed loops for transmit power control for PUSCH transmissions on a first serving cell.

At step 308, the network node transmits, to the wireless device, the determined TPC command, the transmission providing an indication of a particular closed loop of the plurality of closed loops to which the wireless device should apply the TPC command. In certain embodiments, the indication of the particular closed loop of the plurality of closed loops to which the wireless device should apply the TPC command may comprise a DCI CRC of a PDCCH carrying the received TPC command. In certain embodiments, the indication of the particular closed loop of the plurality of closed loops to which the wireless device should apply the TPC command may comprise an identifier used to scramble the DCI CRC of the PDCCH. The identifier may be associated with the particular closed loop of the plurality of closed loops. The identifier may comprise a radio network temporary identifier.

In certain embodiments, the indication of the particular closed loop of the plurality of closed loops to which the wireless device should apply the TPC command may comprise one or more closed loop indication bits included in DCI. The closed loop indication bits may be explicit. The DCI may comprise one or more of a TPC indication and a closed loop indication for multiple wireless devices in one PDCCH.

Figure 4:
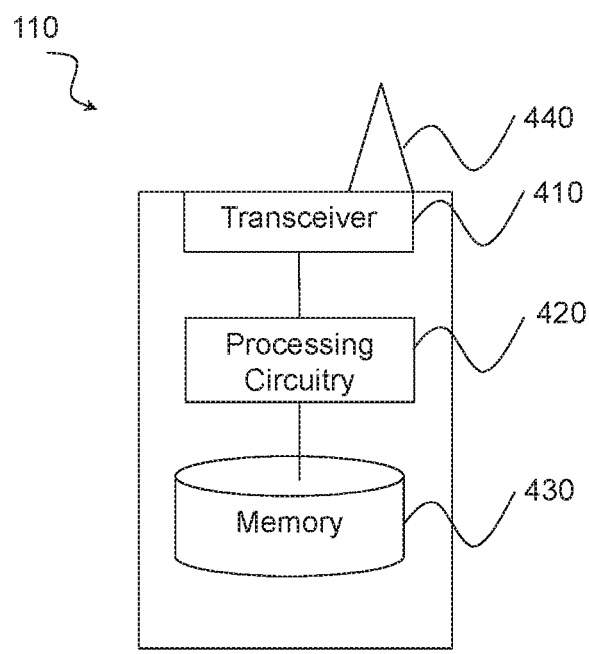
FIG. 4 is a block schematic of an exemplary wireless device, in accordance with certain embodiments.

FIG. 4 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 410, processing circuitry 420, and memory 430. In some embodiments, transceiver 410 facilitates transmitting wireless signals to and receiving wireless signals from network node 115 (e.g., via antenna 440), processing circuitry 420 executes instructions to provide some or all of the functionality described above as being provided by wireless device 110, and memory 430 stores the instructions executed by processing circuitry 420.

Processing circuitry 420 may include any suitable combination of hardware and software implemented in one or more modules to execute instructions and manipulate data to perform some or all of the described functions of wireless device 110, such as the functions of wireless device 110 described above in relation to FIGS. 1-3. In some embodiments, processing circuitry 420 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 430 is generally operable to store instructions, such as a computer program, software, an application including one or more of logic, rules, algorithms, code, tables, etc. and/or other instructions capable of being executed by processing circuitry 420. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 420.

Other embodiments of wireless device 110 may include additional components beyond those shown in FIG. 4 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 420. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 5:
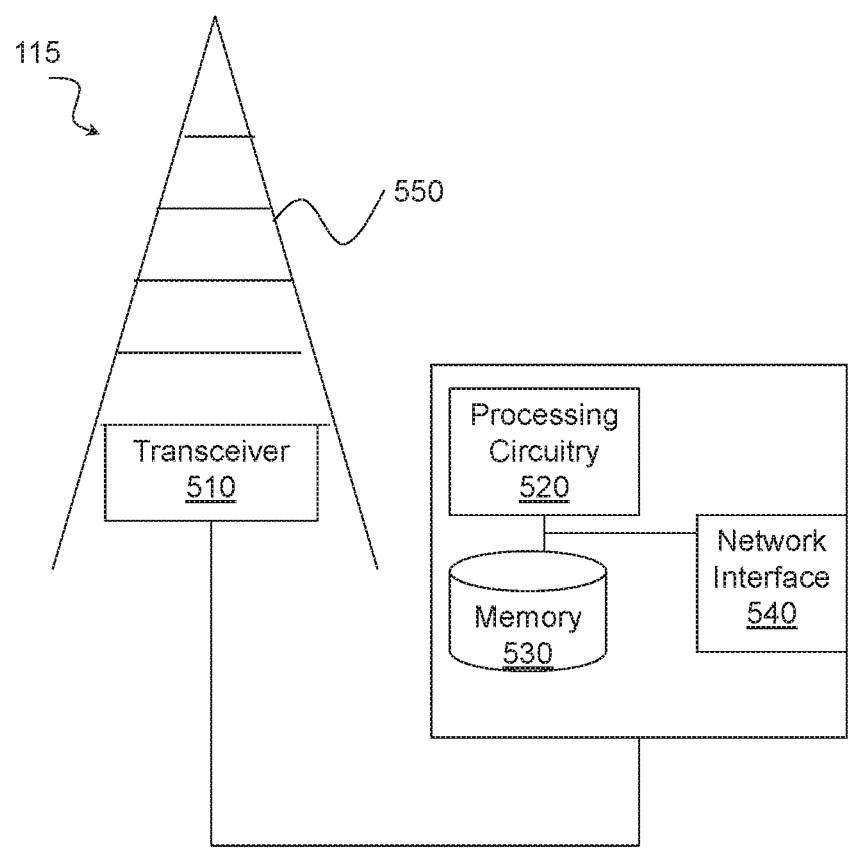
FIG. 5 is a block schematic of an exemplary network node, in accordance with certain embodiments.

FIG. 5 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 510, processing circuitry 520, memory 530, and network interface 540. In some embodiments, transceiver 510 facilitates transmitting wireless signals to and receiving wireless signals from wireless device 110 (e.g., via antenna 550), processing circuitry 520 executes instructions to provide some or all of the functionality described above as being provided by a network node 115, memory 530 stores the instructions executed by processing circuitry 520, and network interface 540 communicates signals to backend network components, such as a gateway, switch, router, Internet, Public Switched Telephone Network (PSTN), core network nodes or radio network controllers 130, etc.

Processing circuitry 520 may include any suitable combination of hardware and software implemented in one or more modules to execute instructions and manipulate data to perform some or all of the described functions of network node 115, such as those described above in relation to FIGS. 1-3. In some embodiments, processing circuitry 520 may include, for example, one or more computers, one or more CPUs, one or more microprocessors, one or more applications, one or more ASICs, one or more FPGAs and/or other logic.

Memory 530 is generally operable to store instructions, such as a computer program, software, an application including one or more of logic, rules, algorithms, code, tables, etc. and/or other instructions capable of being executed by processing circuitry 520. Examples of memory 530 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 540 is communicatively coupled to processing circuitry 520 and may refer to any suitable device operable to receive input for network node 115, send output from network node 115, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of network node 115 may include additional components beyond those shown in FIG. 5 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 6:
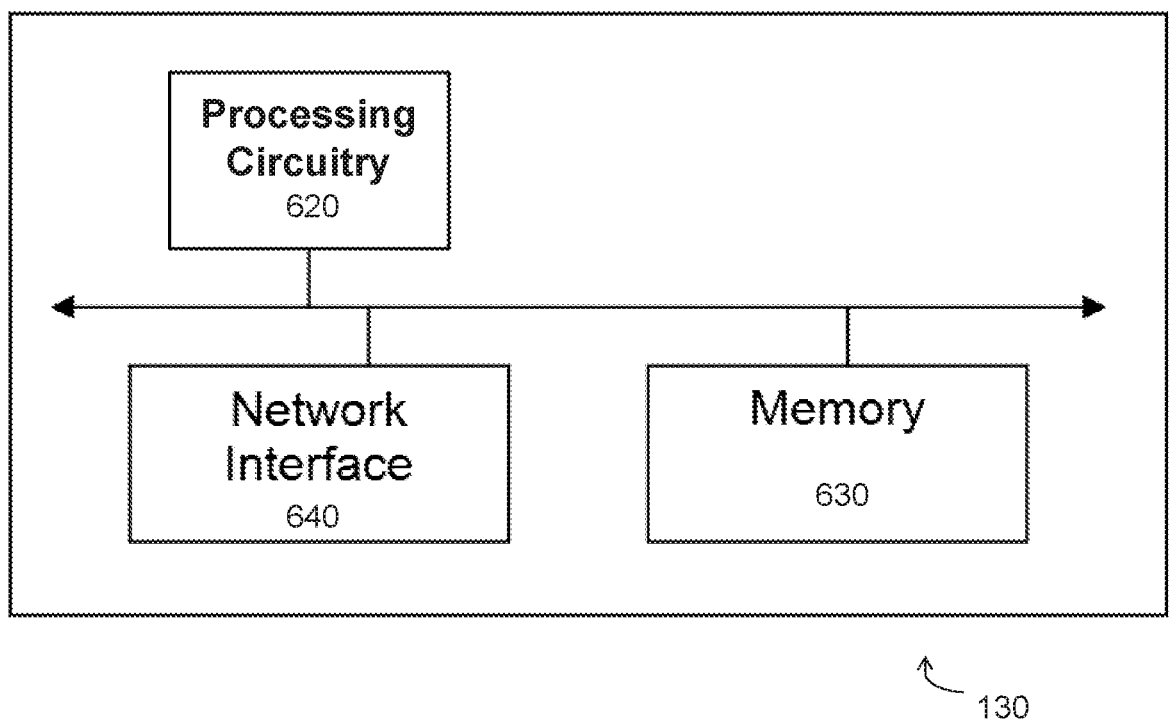
FIG. 6 is a block schematic of an exemplary radio network controller or core network node, in accordance with certain embodiments.

FIG. 6 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 620, memory 630, and network interface 640. In some embodiments, processing circuitry 620 executes instructions to provide some or all of the functionality described above as being provided by the network node, memory 630 stores the instructions executed by processing circuitry 620, and network interface 640 communicates signals to any suitable node, such as a gateway, switch, router, Internet, Public Switched Telephone Network (PSTN), network nodes 115, radio network controllers or core network nodes 130, etc.

Processing circuitry 620 may include any suitable combination of hardware and software implemented in one or more modules to execute instructions and manipulate data to perform some or all of the described functions of the radio network controller or core network node 130. In some embodiments, processing circuitry 620 may include, for example, one or more computers, one or more CPUs, one or more microprocessors, one or more applications, one or more ASICs, one or more FPGAs and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 6 that may be responsible for providing certain aspects of the network node's functionality, including any of the functionality described above and/or any additional functionality (including any functionality necessary to support the solution described above).

Figure 7:
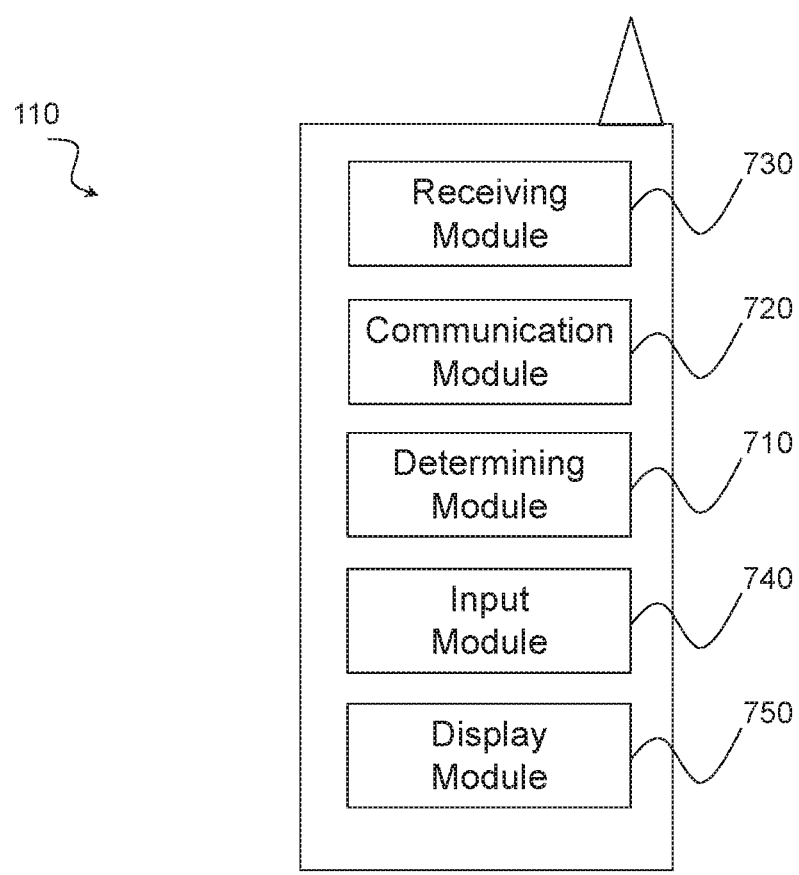
FIG. 7 is a block schematic of an exemplary wireless device, in accordance with certain embodiments.

FIG. 7 is a schematic block diagram of an exemplary wireless device, in accordance with certain embodiments. Wireless device 110 may include one or more modules. For example, wireless device 110 may include a determining module 710, a communication module 720, a receiving module 730, an input module 740, a display module 750, and any other suitable modules. In some embodiments, one or more of determining module 710, communication module 720, receiving module 730, input module 740, display module 750, or any other suitable module may be implemented using one or more processors, such as processing circuitry 420 described above in relation to FIG. 4. In certain embodiments, the functions of two or more of the various modules may be combined into a single module. Wireless device 110 may perform the methods for TPC command indication for multiple closed loops described above in relation to FIGS. 1-3.

Determining module 710 may perform the processing functions of wireless device 110. For example, determining module 710 may determine a particular closed loop of the plurality of closed loops to which the received TPC command should be applied. In certain embodiments, determining module 710 may determine the particular closed loop of the plurality of closed loops to which the received TPC command should be applied based on a DCI CRC of a PDCCH carrying the received TPC command. In certain embodiments, determining module 710 may determine the particular closed loop of the plurality of closed loops to which the received TPC command should be applied based on one or more closed loop indication bits included in DCI. As another example, determining module 710 may apply the received TPC command to the determined particular closed loop of the plurality of closed loops. As still another example, determining module 710 may: detect a PDCCH corresponding to a first DCI format; determine an identifier used to scramble the DCI CRC of the PDCCH; and apply the received TPC command to a first closed loop that corresponds to the determined identifier. As yet another example, determining module 710 may: detect a PDCCH corresponding to a first DCI format that does not include any resource allocation bits; use a first set of bits in the DCI of the PDCCH to determine the received TPC command based on one or more bitfield positions of the first set of bits; and use a second set of bits in the DCI to determine a closed loop to which the received TPC command from the first set of bits should be applied.

Determining module 710 may include or be included in one or more processors, such as processing circuitry 420 described above in relation to FIG. 4. Determining module 710 may include analog and/or digital circuitry configured to perform any of the functions of determining module 710 and/or processing circuitry 420 described above. The functions of determining module 710 described above may, in certain embodiments, be performed in one or more distinct modules.

Communication module 720 may perform the transmission functions of wireless device 110. Communication module 720 may include a transmitter and/or a transceiver, such as transceiver 410 described above in relation to FIG. 4. Communication module 720 may include circuitry configured to wirelessly transmit messages and/or signals. In particular embodiments, communication module 720 may receive messages and/or signals for transmission from determining module 710. In certain embodiments, the functions of communication module 720 described above may be performed in one or more distinct modules.

Receiving module 730 may perform the receiving functions of wireless device 110. For example, receiving module 730 may receive a TPC command for one of a plurality of closed loops configured for wireless device 110. Receiving module 730 may include a receiver and/or a transceiver. Receiving module 730 may include a receiver and/or a transceiver, such as transceiver 410 described above in relation to FIG. 4. Receiving module 730 may include circuitry configured to wirelessly receive messages and/or signals. In particular embodiments, receiving module 730 may communicate received messages and/or signals to determining module 710. The functions of receiving module 730 described above may, in certain embodiments, be performed in one or more distinct modules.

Input module 740 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 710. The functions of input module 740 described above may, in certain embodiments, be performed in one or more distinct modules.

Display module 750 may present signals on a display of wireless device 110. Display module 750 may include the display and/or any appropriate circuitry and hardware configured to present signals on the display. Display module 750 may receive signals to present on the display from determining module 710. The functions of display module 750 described above may, in certain embodiments, be performed in one or more distinct modules.

Determining module 710, communication module 720, receiving module 730, input module 740, and display module 750 may include any suitable configuration of hardware and/or software. Wireless device 110 may include additional modules beyond those shown in FIG. 7 that may be responsible for providing any suitable functionality, including any of the functionality described above and/or any additional functionality (including any functionality necessary to support the various solutions described herein).

Figure 8:
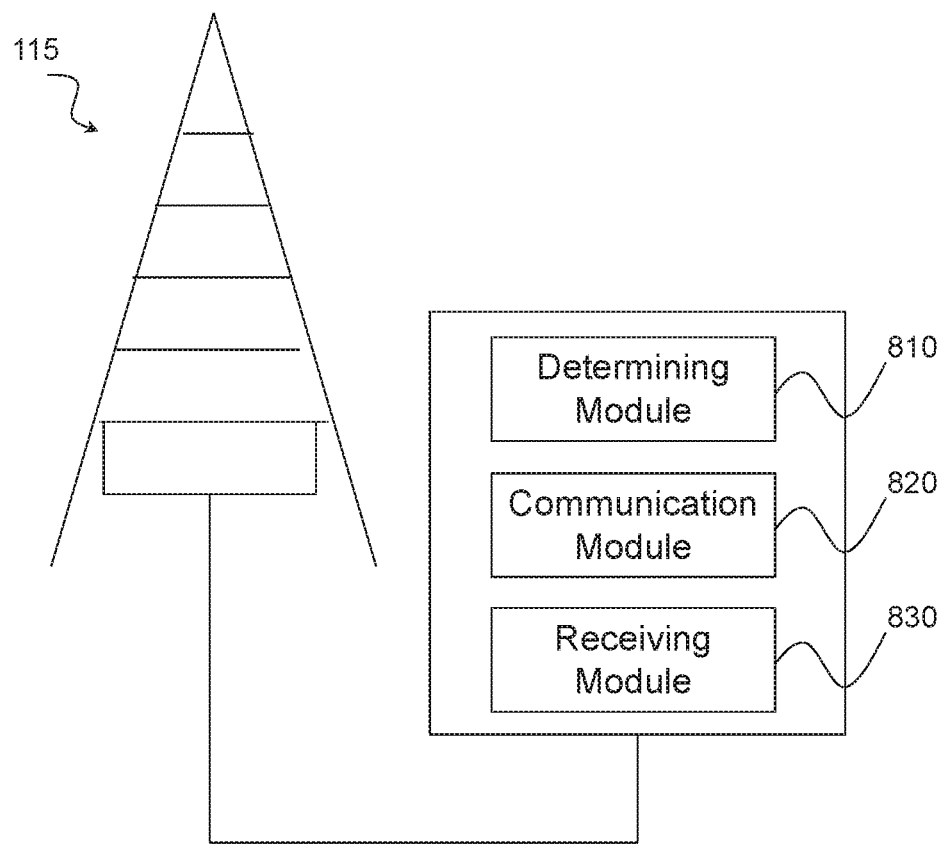
FIG. 8 is a block schematic of an exemplary network node, in accordance with certain embodiments.

FIG. 8 is a schematic block diagram of an exemplary network node 115, in accordance with certain embodiments. Network node 115 may include one or more modules. For example, network node 115 may include determining module 810, communication module 820, receiving module 830, and any other suitable modules. In some embodiments, one or more of determining module 810, communication module 820, receiving module 830, or any other suitable module may be implemented using one or more processors, such as processing circuitry 520 described above in relation to FIG. 5. In certain embodiments, the functions of two or more of the various modules may be combined into a single module. Network node 115 may perform the methods for TPC command indication described above with respect to FIGS. 1-3.

Determining module 810 may perform the processing functions of network node 115. For example, determining module 810 may determine a TPC command for one of a plurality of closed loops configured for a wireless device (e.g., a UE). Determining module 810 may include or be included in one or more processors, such as processing circuitry 520 described above in relation to FIG. 5. Determining module 810 may include analog and/or digital circuitry configured to perform any of the functions of determining module 810 and/or processing circuitry 520 described above. The functions of determining module 810 may, in certain embodiments, be performed in one or more distinct modules. As one example, in certain embodiments the functions of determining module 810 may be performed by one or more of a local breakout function gateway module, an interaction gateway module, and a function for recommendation module.

Communication module 820 may perform the transmission functions of network node 115. For example, communication module 820 may transmit, to a wireless device (e.g., a UE), the determined TPC command, the transmission providing an indication of a particular closed loop of the plurality of closed loops to which the wireless device should apply the TPC command. Communication module 820 may transmit messages to one or more of wireless devices 110. Communication module 820 may include a transmitter and/or a transceiver, such as transceiver 510 described above in relation to FIG. 5. Communication module 820 may include circuitry configured to wirelessly transmit messages and/or signals. In particular embodiments, communication module 820 may receive messages and/or signals for transmission from determining module 810 or any other module. The functions of communication module 820 may, in certain embodiments, be performed in one or more distinct modules.

Receiving module 830 may perform the receiving functions of network node 115. Receiving module 830 may receive any suitable information from a wireless device. Receiving module 830 may include a receiver and/or a transceiver, such as transceiver 510 described above in relation to FIG. 5. Receiving module 830 may include circuitry configured to wirelessly receive messages and/or signals. In particular embodiments, receiving module 830 may communicate received messages and/or signals to determining module 810 or any other suitable module. The functions of receiving module 830 may, in certain embodiments, be performed in one or more distinct modules.

Determining module 810, communication module 820, and receiving module 830 may include any suitable configuration of hardware and/or software. Network node 115 may include additional modules beyond those shown in FIG. 8 that may be responsible for providing any suitable functionality, including any of the functionality described above and/or any additional functionality (including any functionality necessary to support the various solutions described herein).

Summary of Example Embodiments

According to one example embodiment, a method in a wireless device is disclosed. The method comprises receiving a TPC command for one of a plurality of closed loops configured for the wireless device. The method comprises determining a particular closed loop of the plurality of closed loops to which the received TPC command should be applied.

In certain embodiments, one or more of the following may apply:
- the method may comprise applying the received TPC command to the determined particular closed loop of the plurality of closed loops;
- the particular closed loop of the plurality of closed loops to which the received TPC command should be applied may be determined based on a DCI CRC of a PDCCH carrying the received TPC command;
- the particular closed loop of the plurality of closed loops to which the received TPC command should be applied may be determined based on one or more closed loop indication bits included in DCI;
- the closed loop indication bits may be explicit;
- the DCI may comprise one or more of a TPC indication and a closed loop indication for multiple wireless devices in one PDCCH;
- the plurality of closed loops may comprise a plurality of closed loop power control adjustment states;
- the plurality of closed loops may comprise a plurality of closed loops for transmit power control for PUSCH transmissions on a first serving cell;
- the method may comprise:
  - detecting a PDCCH corresponding to a first DCI format;
  - determining an identifier used to scramble the DCI CRC of the PDCCH; and
  - applying the received TPC command to a first closed loop that corresponds to the determined identifier;
  - the identifier may comprise a radio network temporary identifier;

the method may comprise:
- detecting a PDCCH corresponding to a first DCI format that does not include any resource allocation bits;
- using a first set of bits in the DCI of the PDCCH to determine the received TPC command based on one or more bitfield positions of the first set of bits; and
- using a second set of bits in the DCI to determine a closed loop to which the received TPC command from the first set of bits should be applied.

According to another example embodiment, a wireless device is disclosed. The wireless device comprises a receiver and processing circuitry coupled to the receiver. The processing circuitry is configured to receive, via the receiver, a TPC command for one of a plurality of closed loops configured for the wireless device. The processing circuitry is configured to determine a particular closed loop of the plurality of closed loops to which the received TPC command should be applied.

According to another example embodiment, a method in a network node is disclosed. The method comprises determining a TPC command for one of a plurality of closed loops configured for a wireless device. The method comprises transmitting, to the wireless device, the determined TPC command, the transmission providing an indication of a particular closed loop of the plurality of closed loops to which the wireless device should apply the TPC command. In certain embodiments, one or more of the following may apply:
- the indication of the particular closed loop of the plurality of closed loops to which the wireless device should apply the TPC command may comprise a DCI CRC of a PDCCH carrying the received TPC command;
- the indication of the particular closed loop of the plurality of closed loops to which the wireless device should apply the TPC command may comprise an identifier used to scramble the DCI CRC of the PDCCH;
- the identifier may be associated with the particular closed loop of the plurality of closed loops;
- the identifier may comprise a radio network temporary identifier;
- the indication of the particular closed loop of the plurality of closed loops to which the wireless device should apply the TPC command may comprise one or more closed loop indication bits included in DCI;
- the closed loop indication bits may be explicit;
- the DCI may comprise one or more of a TPC indication and a closed loop indication for multiple wireless devices in one PDCCH;
- the plurality of closed loops may comprise a plurality of closed loop power control adjustment states; and
- the plurality of closed loops may comprise a plurality of closed loops for transmit power control for PUSCH transmissions on a first serving cell.

According to another example embodiment, a network node is disclosed. The network node comprises a transmitter and processing circuitry coupled to the transmitter. The processing circuitry is configured to determine a TPC command for one of a plurality of closed loops configured for a wireless device. The processing circuitry is configured to transmit, via the transmitter to the wireless device, the determined TPC command, the transmission providing an indication of a particular closed loop of the plurality of closed loops to which the wireless device should apply the TPC command.

Figure 9:
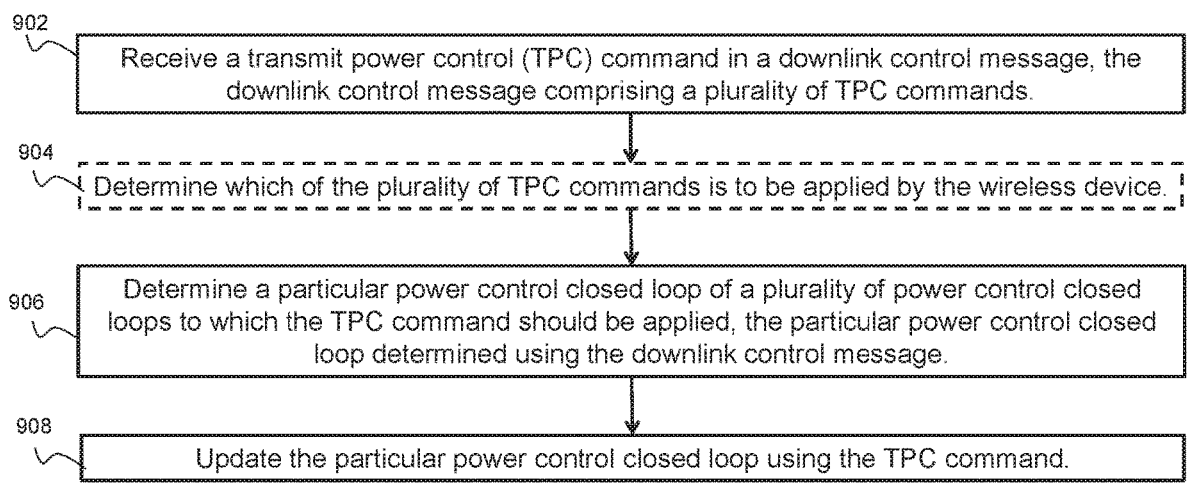
FIGS. 9-12 are flow diagrams of methods in a wireless device, in accordance with certain embodiments.

FIG. 9 illustrates an example of a method that may be performed by a wireless device, in accordance with certain embodiments. In some embodiments, the method of FIG. 9 may be performed by a wireless device 110 (described above) that has been configured with multiple power control closed loops for a serving cell. Each of the plurality of power control closed loops may be associated with a respective beam of the serving cell. In general, the multiple power control closed loops may be used by the wireless device for adjusting transmission powers of uplink transmissions on the serving cell, such as PUSCH, PUCCH, and/or SRS transmissions on the serving cell.

At step 902, the method receives a downlink control message. The downlink control message comprises a plurality of TPC commands. For example, in some embodiments, the downlink control message may comprise TPC commands for multiple of the power control closed loops that have been configured for the wireless device. In some embodiments, the downlink control message may be addressed to a group comprising the wireless device and one or more other wireless devices, and the plurality of TPC commands received in the downlink control message may include at least one TPC command associated with the wireless device and one or more TPC commands associated with the one or more other wireless devices in the group. In certain embodiments, the downlink control message is a PDCCH message (i.e., a message received via the PDCCH). In some embodiments, the downlink control message contains DCI. In some embodiments, the downlink control message that comprises a plurality of TPC commands does not contain bits indicating an assignment of uplink resources.

At step 904, in response to receiving the downlink control message comprising the plurality of TPC commands, the method may determine which of the plurality of TPC commands is to be applied by the wireless device. In some embodiments, the TPC command is determined using a bit field location in the DCI of the downlink control message. The bit field location may be indicated to the wireless device by higher layers.

Figure 10:
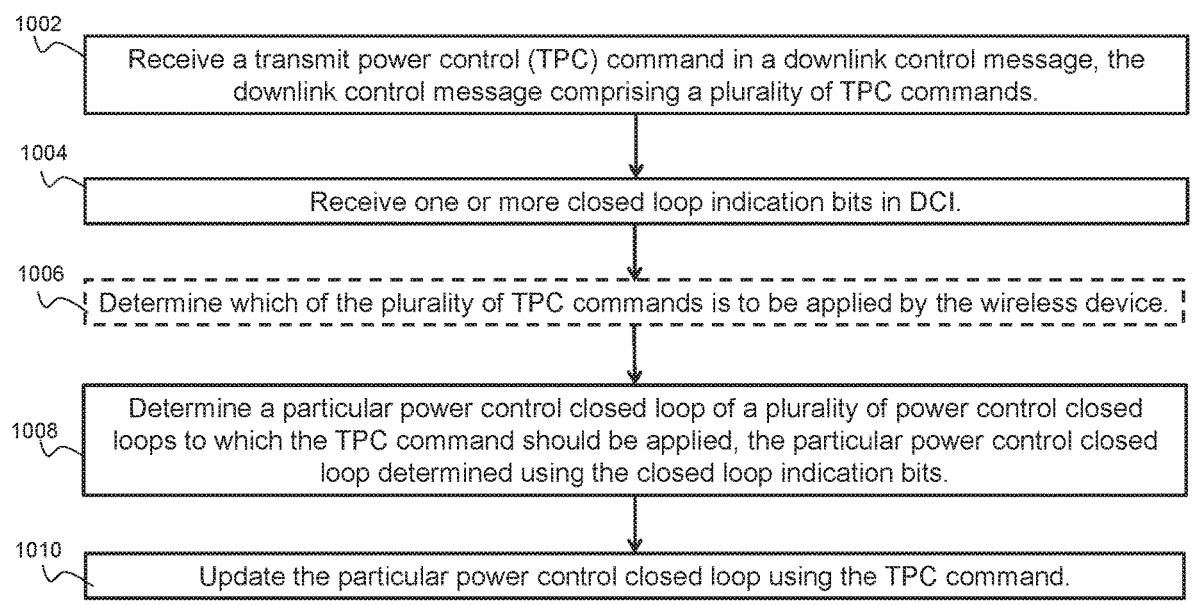
Figure 11:
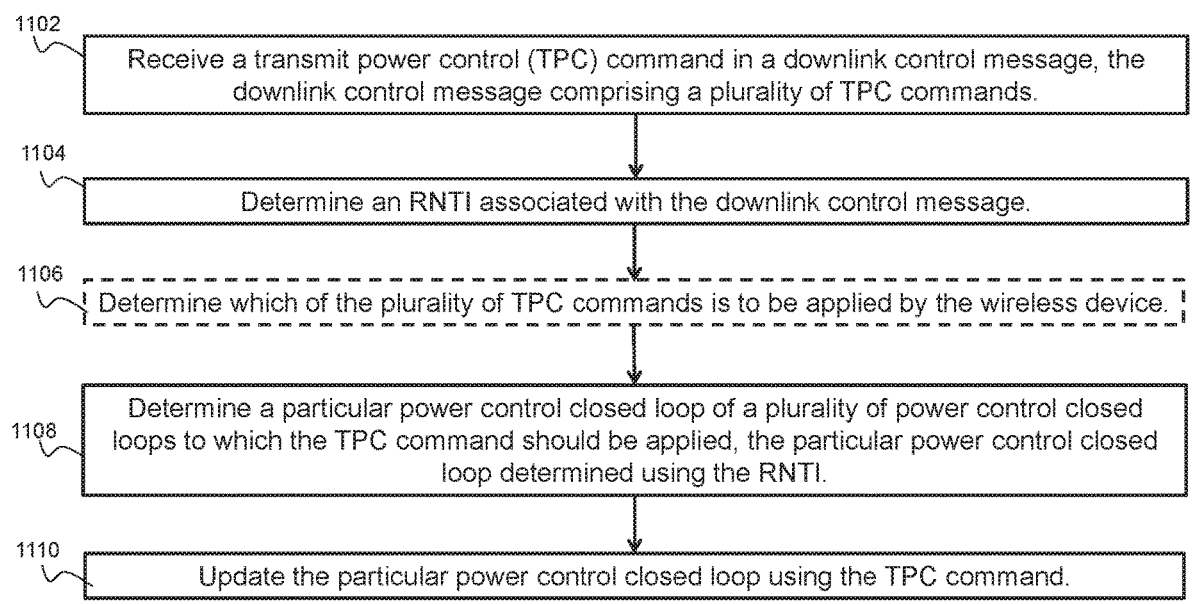
Figure 12:
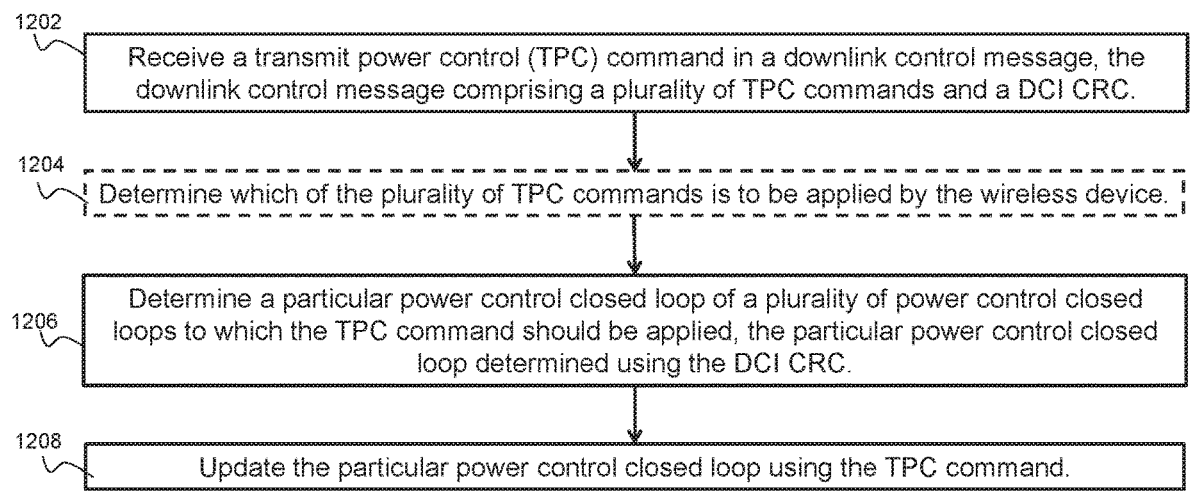

At step 906, the method determines a particular power control closed loop of the plurality of power control closed loops to which the TPC command received in step 902 (e.g., the TPC command determined in step 904) should be applied. The particular power control closed loop is determined using the downlink control message. FIGS. 10-12 provide examples of methods for determining the particular power control closed loop using the downlink control message.

At step 908, the method comprises updating the particular power control closed loop using the TPC command. For example, in certain embodiments, the TPC command indicates a power control adjustment ($\delta$) value that should be applied to the particular power control closed loop. Updating the particular power control closed loop may comprise adjusting a transmission power used in transmitting an uplink transmission (such as a PUSCH, PUCCH, or SRS transmission on the serving cell) based on the power control adjustment ($\delta$) value indicated by the TPC command.

FIG. 10 illustrates an example of a method that may be performed by a wireless device, in accordance with certain embodiments. Step 1002 is analogous to step 902 of FIG. 9 in which a method receives a TPC command in a downlink control message and the downlink control message comprises a plurality of TPC commands. At step 1004, the method receives one or more closed loop indication bits in DCI. The one or more closed loop indication bits indicate the particular power control closed loop to which the TPC command applies. For example, the one or more closed loop indication bits may comprise an index value that is associated with a particular power control closed loop. In certain embodiments, the DCI carrying the closed loop indication bits may be received as part of the downlink control message of step 1002. Step 1006 is analogous to step 904 of FIG. 9 in which the method may determine which of the plurality of TPC commands is to be applied by the wireless device. Step 1008 is analogous to step 906 of FIG. 9 in which the method determines a particular power control closed loop of a plurality of power control closed loops to which the TPC command should be applied, wherein step 1008 provides an example in which the particular power control closed loop is determined using the closed loop indication bits received in step 1004. Step 1010 is analogous to step 908 of FIG. 9 in which the method updates the particular power control closed loop using the TPC command.

FIG. 11 illustrates an example of a method that may be performed by a wireless device, in accordance with certain embodiments. Step 1102 is analogous to step 902 of FIG. 9 in which a method receives a TPC command in a downlink control message and the downlink control message comprises a plurality of TPC commands. At step 1104, the method determines an RNTI associated with the downlink control message. For example, the RNTI that a network node uses to scramble a portion of the downlink control message may indicate the particular power control closed loop to which the TPC command applies. Step 1106 is analogous to step 904 of FIG. 9 in which the method may determine which of the plurality of TPC commands is to be applied by the wireless device. Step 1108 is analogous to step 906 of FIG. 9 in which the method determines a particular power control closed loop of a plurality of power control closed loops to which the TPC command should be applied, wherein step 1108 provides an example in which the particular power control closed loop is determined using the RNTI determined in step 1004. Step 1110 is analogous to step 908 of FIG. 9 in which the method updates the particular power control closed loop using the TPC command.

FIG. 12 illustrates an example of a method that may be performed by a wireless device, in accordance with certain embodiments. Step 1202 is analogous to step 902 of FIG. 9 in which a method receives a TPC command in a downlink control message and the downlink control message comprises a plurality of TPC commands. In the example shown in FIG. 12, the downlink control message comprises a DCI CRC. Step 1104 is analogous to step 904 of FIG. 9 in which the method may determine which of the plurality of TPC commands is to be applied by the wireless device. Step 1108 is analogous to step 906 of FIG. 9 in which the method determines a particular power control closed loop of a plurality of power control closed loops to which the TPC command should be applied, wherein step 1208 provides an example in which the particular power control closed loop is determined using the DCI CRC received in step 1202. Step 1110 is analogous to step 908 of FIG. 9 in which the method updates the particular power control closed loop using the TPC command.

Figure 13:
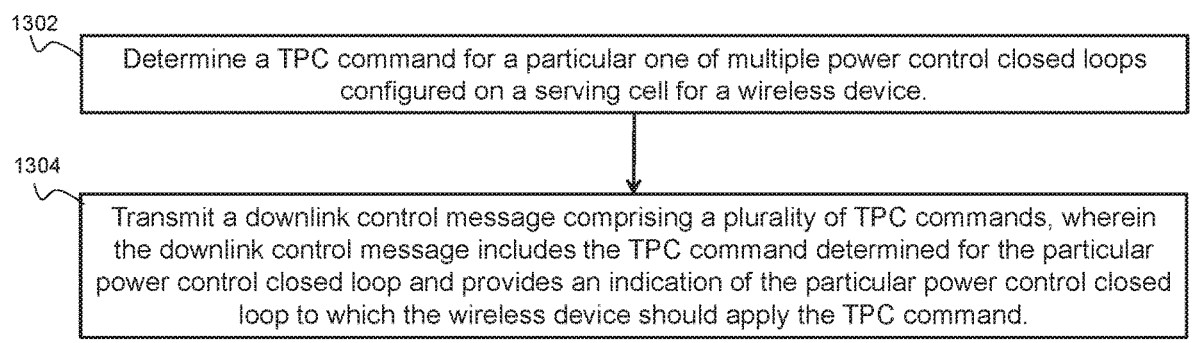

FIG. 13 illustrates an example of a method that may be performed by a network node, such as network node 115, in accordance with certain embodiments. The method may be used to provide power control for a wireless device configured with multiple power control closed loops on a serving cell of the network node. Each of the plurality of power control closed loops may be associated with a respective beam of the serving cell. The power control closed loops are used by the wireless device for adjusting transmission powers of uplink transmissions on the serving cell, such as PUSCH, PUCCH, and/or SRS transmissions on the serving cell.

At step 1302, the method determines a TPC command for a particular one of the multiple power control closed loops configured on the serving cell for the wireless device. In some embodiments, the TPC command indicates a power control adjustment (δ) value that should be applied to the particular power control closed loop. For example, the TPC command may indicate a power control adjustment (δ) value that the wireless device should use to adjust a transmission power of an uplink transmission (such as a PUSCH, PUCCH, or SRS transmission) to the serving cell.

At step 1304, the method transmits a downlink control message comprising a plurality of TPC commands. The downlink control message includes the TPC command determined in step 1302 for the particular power control closed loop and provides an indication of the particular power control closed loop to which the wireless device should apply the TPC command. Examples of this indication are discussed below with respect to FIGS. 14-16. In certain embodiments, the downlink control message is a PDCCH message (e.g., a message transmitted via a PDCCH) containing DCI. In certain embodiments, the downlink control message does not contain bits indicating an assignment of uplink resources.

In certain embodiments, the downlink control message transmitted in step 1304 is addressed to a group comprising the wireless device and one or more other wireless devices, and the plurality of TPC commands transmitted in the downlink control message include at least one TPC command associated with the wireless device and one or more TPC commands associated with the one or more other wireless devices in the group.

In certain embodiments, the method may indicate which of the plurality of TPC commands is to be applied by the wireless device. For example, the downlink control message transmitted in step 1304 may include a bitfield location that is assigned to the wireless device, and the assigned bit field location includes the TPC command that should be applied by the wireless device. Higher layer signaling may be used to indicate which bit field location has been assigned to the wireless device.

Figure 14:
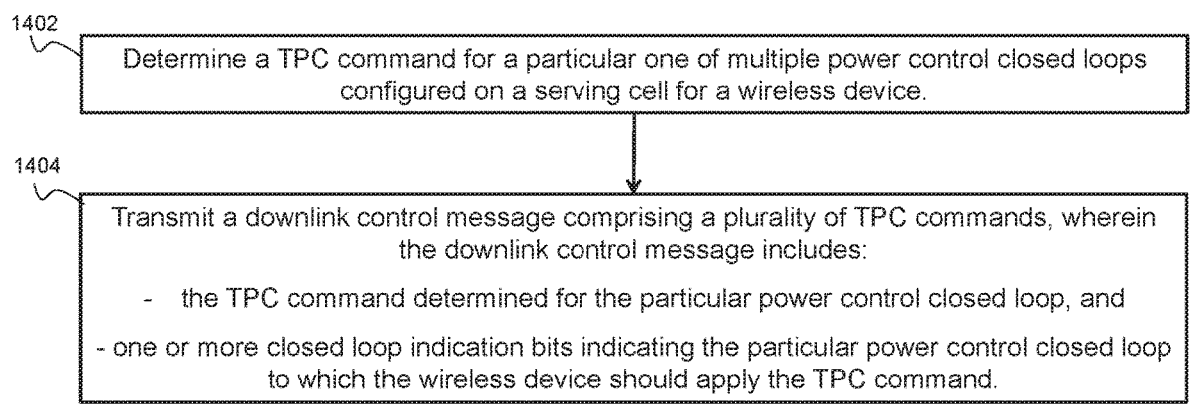

FIG. 14 illustrates an example of a method that may be performed by a network node, in accordance with certain embodiments. Step 1402 is analogous to step 1302 of FIG. 13 in which a method determines a TPC command for a particular one of the multiple power control closed loops configured on the serving cell for the wireless device. Step 1404 is analogous to step 1304 of FIG. 13 in which the method transmits a downlink control message comprising a plurality of TPC commands. The downlink control message includes the TPC command determined in step 1402 for the particular power control closed loop and provides an indication of the particular power control closed loop to which the wireless device should apply the TPC command. In the example of FIG. 14, the indication of the particular power control closed loop comprises one or more closed loop indication bits provided in the downlink control message. In certain embodiments, the one or more closed loop indication bits comprise an index value that is associated with the particular power control closed loop.

In some embodiments, the network node may transmit closed loop indication bits for multiple power control closed loops. For example, the network node may transmit DCI comprising one or more first closed loop indication bits and one or more second closed loop indication bits. The first closed loop indication bits indicate a first power control closed loop to which one of the plurality of TPC commands applies. The second closed loop indication bits indicate a second power control closed loop to which another of the plurality of TPC commands applies. In certain embodiments, the number of first closed loop indication bits is different from the number of second closed loop indication bits.

Figure 15:
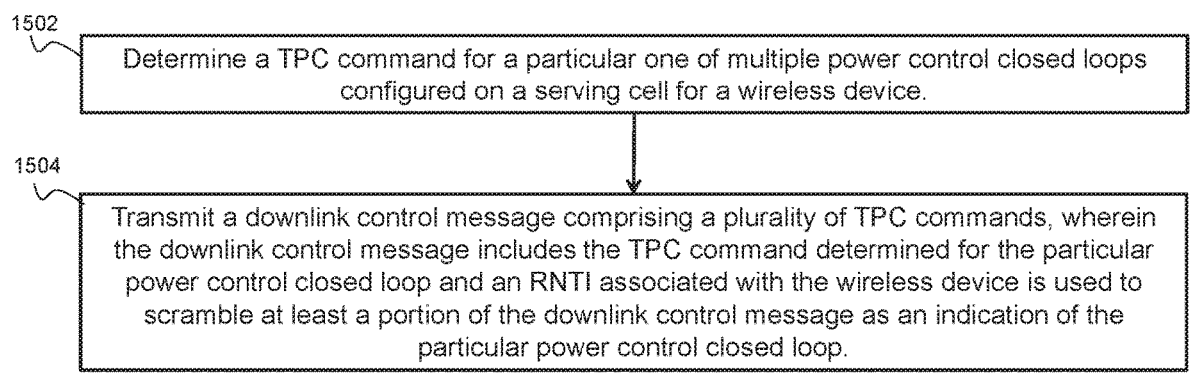

FIG. 15 illustrates an example of a method that may be performed by a network node, in accordance with certain embodiments. Step 1502 is analogous to step 1302 of FIG. 13 in which a method determines a TPC command for a particular one of the multiple power control closed loops configured on the serving cell for the wireless device. Step 1504 is analogous to step 1304 of FIG. 13 in which the method transmits a downlink control message comprising a plurality of TPC commands. The downlink control message includes the TPC command determined in step 1502 for the particular power control closed loop and provides an indication of the particular power control closed loop to which the wireless device should apply the TPC command. In the example of FIG. 15, the method uses an RNTI associated with the wireless device to scramble at least a portion of the downlink control message as an indication of the particular power control closed loop.

Figure 16:
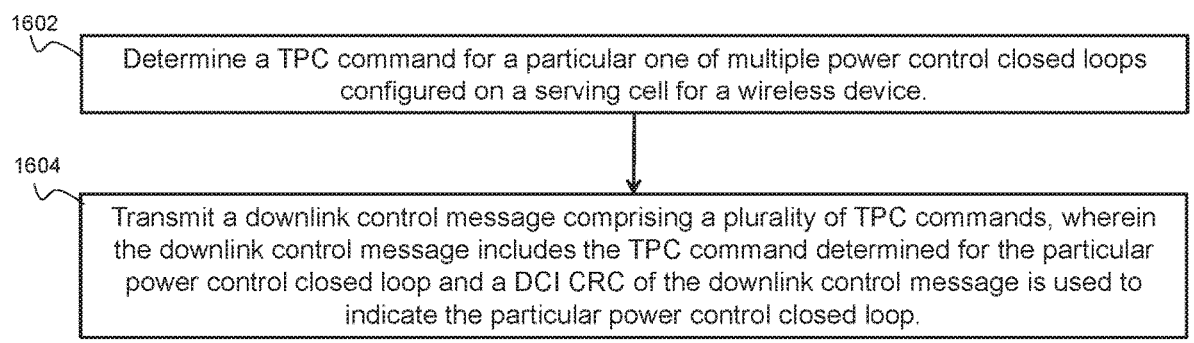

FIG. 16 illustrates an example of a method that may be performed by a network node, in accordance with certain embodiments. Step 1602 is analogous to step 1302 of FIG. 13 in which a method determines a TPC command for a particular one of the multiple power control closed loops configured on the serving cell for the wireless device. Step 1604 is analogous to step 1304 of FIG. 13 in which the method transmits a downlink control message comprising a plurality of TPC commands. The downlink control message includes the TPC command determined in step 1602 for the particular power control closed loop and provides an indication of the particular power control closed loop to which the wireless device should apply the TPC command. In the example of FIG. 16, the method uses a DCI CRC of the downlink control message to indicate the particular power control closed loop.

Certain embodiments of the present disclosure may provide one or more technical advantages. As one example, for a wireless device configured with multiple closed loops, certain embodiments may advantageously help the wireless device unambiguously identify the closed loop to which TPC commands received in a PDDCH should be applied, especially for the cases where PDCCH carries multiple TPC commands applicable to a group of wireless devices. As another example, certain embodiments may advantageously provide a low-overhead solution for indicating group TPC commands with different closed loops for different types of PUSCH transmissions (e.g., grant based vs. grant free, PUSCH corresponding to different beams/TRPs). As still another example, certain embodiments may advantageously provide a more flexible solution as the closed loop is explicitly indicated. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a wireless device configured with multiple power control closed loops for a serving cell, the method comprising:
  receiving an indication of a starting position of a transmit power control (TPC) command in a downlink control message and an indication of a number of bits used for indicating closed loop power control;
  receiving a downlink control message comprising a plurality of TPC commands;
  obtaining the plurality of TPC commands from the downlink control message based on the received indication of the starting position of the TPC command and the indication of the number of bits used for indicating closed loop power control;
  determining a particular power control closed loop of the plurality of power control closed loops to which the TPC command should be applied, the particular power control closed loop determined using the downlink control message; and
  updating the particular power control closed loop using the TPC command.

2. A wireless device configured with multiple power control closed loops for a serving cell, the wireless device comprising:
  a receiver; and
  processing circuitry coupled to the receiver, the processing circuitry configured to:
  receive, via the receiver, an indication of a starting position of a transmit power control (TPC) command in a downlink control message and an indication of a number of bits used for indicating closed loop power control;
  receive, via the receiver, a downlink control message comprising a plurality of TPC commands;
  obtain the plurality of TPC commands from the downlink control message based on the received indication of the starting position of the TPC command and the indication of the number of bits used for indicating closed loop power control;
  determine a particular power control closed loop of the plurality of power control closed loops to which the TPC command should be applied, the particular power control closed loop determined using the downlink control message; and
  update the particular power control closed loop using the TPC command.

3. The wireless device of claim 2, wherein the downlink control message is a Physical Downlink Control Channel (PDCCH) message containing downlink control information (DCI).

4. The wireless device of claim 3, wherein the processing circuitry is further configured to:
  receive, via the receiver, one or more closed loop indication bits in the DCI; and
  use the closed loop indication bits in determining the particular power control closed loop.

5. The wireless device of claim 4, wherein the one or more closed loop indication bits comprise an index value that is associated with the particular power control closed loop.

6. The wireless device of claim 2, wherein the processing circuitry is further configured to:
  determine a Radio Network Temporary Identifier (RNTI) associated with the downlink control message; and
  use the RNTI in determining the particular power control closed loop.

7. The wireless device of claim 2, wherein the processing circuitry is further configured to use a DCI cyclic redundancy check (CRC) of the downlink control message in determining the particular power control closed loop.

8. The wireless device of claim 2, wherein the multiple power control closed loops are used by the wireless device for adjusting transmission powers of Physical Uplink Shared Channel (PUSCH) transmissions on the serving cell.

9. The wireless device of claim 2, wherein the multiple power control closed loops are used by the wireless device for adjusting transmission powers of Physical Uplink Control Channel (PUCCH) transmissions on the serving cell.

10. The wireless device of claim 2, wherein the multiple power control closed loops are used by the wireless device for adjusting transmission powers of Sounding Reference Signal (SRS) transmissions on the serving cell.

11. The wireless device of claim 2, wherein the TPC command indicates a power control adjustment ($\delta$) value that should be applied to the particular power control closed loop.

12. The wireless device of claim 2, wherein the downlink control message does not contain bits indicating an assignment of uplink resources.

13. The wireless device of claim 2, wherein
  the downlink control message is addressed to a group comprising the wireless device and one or more other wireless devices; and
  the plurality of TPC commands received in the downlink control message include one or more TPC commands associated with the one or more other wireless devices in the group.

14. The wireless device of claim 2, wherein the processing circuitry is further configured to, in response to receiving the downlink control message comprising the plurality of TPC commands, determine which of the plurality of TPC commands is to be applied by the wireless device.

15. The wireless device of claim 14, wherein the TPC command is determined using a bit field location in the DCI of the downlink control message.

16. The wireless device of claim 15, wherein the bit field location is indicated to the wireless device by higher layers.

17. The wireless device of claim 2, wherein each of the plurality of power control closed loops is associated with a respective beam of the serving cell.

18. The wireless device of claim 2, wherein to update the particular power control closed loop, the processing circuitry is configured to adjust a transmission power used in transmitting a physical uplink shared channel (PUSCH) transmission, the transmission power adjusted based on the power control adjustment ($\delta$) value indicated by the particular TPC command.

* * * * *